United States Patent
Kumazaki et al.

(10) Patent No.: US 8,348,795 B2
(45) Date of Patent: Jan. 8, 2013

(54) CONTROL DEVICE FOR POWER TRANSMISSION DEVICE

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/256,514

(22) PCT Filed: Jan. 8, 2010

(86) PCT No.: PCT/JP2010/050126
§ 371 (c)(1),
(2), (4) Date: Sep. 14, 2011

(87) PCT Pub. No.: WO2010/106824
PCT Pub. Date: Sep. 23, 2010

(65) Prior Publication Data
US 2012/0004064 A1    Jan. 5, 2012

(30) Foreign Application Priority Data
Mar. 14, 2009 (JP) .................. 2009-062149

(51) Int. Cl.
*F16H 3/72* (2006.01)
*F16H 48/20* (2012.01)
*B60K 1/02* (2006.01)
*B60W 10/08* (2006.01)

(52) U.S. Cl. .................. 475/5; 475/84; 477/3; 477/109

(58) Field of Classification Search .................. 475/84; 477/3, 109
See application file for complete search history.

(56) References Cited

U.S. PATENT DOCUMENTS

| | | | |
|---|---|---|---|
| 5,833,570 A | 11/1998 | Tabata et al. | |
| 2008/0195286 A1* | 8/2008 | Tabata et al. | 701/51 |
| 2008/0261770 A1* | 10/2008 | Tabata et al. | 477/5 |
| 2008/0312029 A1 | 12/2008 | Matsubara et al. | |
| 2009/0156359 A1* | 6/2009 | Tabata et al. | 477/108 |

FOREIGN PATENT DOCUMENTS

| DE | 112006001264 T5 | 4/2008 |
|---|---|---|
| DE | 102008001951 A1 | 1/2009 |
| JP | 9 322307 | 12/1997 |
| JP | 09-331603 | 12/1997 |

(Continued)

OTHER PUBLICATIONS

International Search Report Issued Apr. 6, 2010 in PCT/JP10/050126 filed Jan. 8, 2010.
Japanese Office Action Issued Apr. 6, 2010 in Patent Application No. 2009-062149 filed Mar. 14, 2009.

*Primary Examiner* — Edwin A Young
(74) *Attorney, Agent, or Firm* — Oblon, Spivak, McClelland, Maier & Neustadt, L.L.P.

(57) ABSTRACT

It is provided a control device for a power transmission device including a regenerative electric motor via a stepped shifting mechanism, wherein when a shift of the stepped shifting mechanism is performed in a regenerative state of the electric motor, the control device for a power transmission device increases an input shaft rotation speed of the stepped shifting mechanism through hydraulic control before a shift ending period, and, in the shift ending period, restrains an increase of the input shaft rotation speed through the hydraulic control and controls an input shaft rotation speed of the stepped shifting mechanism with the electric motor to be a target rotation speed after the shift.

20 Claims, 9 Drawing Sheets

FOREIGN PATENT DOCUMENTS

| | | |
|---|---|---|
| JP | 10 24745 | 1/1998 |
| JP | 2001-153218 | 6/2001 |
| JP | 2004 204958 | 7/2004 |
| JP | 2005 329926 | 12/2005 |
| JP | 2006 194412 | 7/2006 |
| JP | 2006 335127 | 12/2006 |
| JP | 2007-311309 A | 11/2007 |
| JP | 2008 290582 | 12/2008 |

* cited by examiner

| | C1 | C2 | C3 | B1 | B2 | F | GEAR RATIO | STEP |
|---|---|---|---|---|---|---|---|---|
| 1st | O | | | | (O) | O | 3.20 | |
| 2nd | O | | | O | | | 1.72 | 1.86 |
| 3rd | O | O | | | | | 1.00 | 1.72 |
| 4th | | O | | O | | | 0.67 | 1.49 |
| Rev | | | O | | O | | 2.04 | |
| N | | | | | | | | |

O ENGAGED

CONTROL DEVICE FOR POWER TRANSMISSION DEVICE

TECHNICAL FIELD

The present invention relates to a control device for a power transmission device that includes a regenerative electric motor via a stepped shifting mechanism, and, more particularly, to the control in the case of performing a coast down shift.

BACKGROUND ART

A so-called hybrid vehicle is kn that includes a plurality of power sources, for example, a prime mover such as an engine and an electric motor such as a motor. For example, a vehicle disclosed in Patent Document 1 is the hybrid vehicle. In such a hybrid vehicle, regenerative control is performed during deceleration etc., of the vehicle to convert a kinetic energy of the vehicle into an electric energy.

On the other hand, in a stepped shifting mechanism such as an automatic transmission, the gear ratio thereof is changed i.e., a shift is performed such that the prime mover can be operated in an efficient range depending on a traveling state of the vehicle.

PRIOR ART DOCUMENT

Patent Document

Patent Document 1: Japanese Laid-Open Patent Publication No. 2005-329926

SUMMARY OF THE INVENTION

Problem to be Solved by the Invention

Such a hybrid vehicle has a problem of a tendency to generate a shift shock when a shift of a stepped shifting mechanism is performed in a regenerative state, for example, during coasting. To solve this problem, Patent Document 1 discloses an example of performing a shift after a braking force acquired by regeneration is replaced by a braking force of a brake at the time of shifting in the regenerative state.

However, since the regeneration is not performed while the shift is performed in the technique of Patent Document 1, the regeneration efficiency drops and the energy efficiency deteriorates. If the shift (clutch-to-clutch shift) is performed by using a change in engagement of friction engagement devices in the stepped shifting mechanism, a response of oil pressure and a torque capacity of the friction engagement devices are changed due to variations of an oil temperature of operating oil, a pack clearance, etc., of the stepped shifting mechanism and, therefore, it is highly difficult to achieve shifting with less shift shock in all the vehicle states.

The present invention was conceived in view of the situations and it is therefore an object of the present invention to provide a control device for a power transmission device including a regenerative electric motor via a stepped shifting mechanism, which is capable of suppressing the reduction of regenerative efficiency and reducing the occurrence of shift shock when a shift of the stepped shifting mechanism is performed during regenerative traveling.

The object indicated above can be achieved according to a first aspect of the present invention, which provides a control device for a power transmission device including a regenerative electric motor via a stepped shifting mechanism, wherein when a shift of the stepped shifting mechanism is performed in a regenerative state of the electric motor, the control device for a power transmission device increases an input shaft rotation speed of the stepped shifting mechanism through hydraulic control before a shift ending period, and, in the shift ending period, restrains an increase of the input shaft rotation speed through the hydraulic control and controls an input shaft rotation speed of the stepped shifting mechanism with the electric motor to be a target rotation speed after the shift.

According to the first aspect of the invention, if a shift of the stepped shifting mechanism is performed in a regenerative state of the electric motor, since an input shaft rotation speed of the stepped shifting mechanism is increased through hydraulic control before the shift ending period, an increase of the input shaft rotation speed through the hydraulic control is restrained and the regeneration is performed by the electric motor before the shift ending period and, therefore, the deterioration of the regenerative efficiency is reduced. On the other hand, the input shaft rotation speed of the stepped shifting mechanism is controlled by the electric motor to be a target rotation speed after the shift in the shift ending period, the engagement shock can be reduced when the friction engagement devices are engaged in the stepped shifting mechanism, thereby reducing the shift shock.

Preferably, since the engagement oil pressure is reduced in the shift ending period by the control device for a power transmission device in comparison with that before the shift ending period, when the input shaft rotation speed of the stepped shifting mechanism is controlled by the electric motor in the shift ending period, the engagement oil pressure is reduced in comparison with that before the shift ending period and the torque capacity is lowered in the friction engagement elements to be engaged by the shift and, therefore, the engagement shock can be reduced when the friction engagement devices are engaged in the stepped shifting mechanism, thereby reducing the shift shock.

Preferably, since the reduction of the engagement oil pressure is performed by reducing or retaining the engagement oil pressure or relaxing the oil pressure gradient before and after the shift ending period, when the input shaft rotation speed of the stepped shifting mechanism is controlled by the electric motor in the shift ending period, the engagement oil pressure is reduced by reducing or retaining the engagement oil pressure or relaxing the oil pressure gradient before and after the shift ending period; therefore, the torque capacity is lowered in the friction engagement elements to be engaged by the shift; and, as a result, the engagement shock can be reduced when the friction engagement devices are engaged in the stepped shifting mechanism, thereby reducing the shift shock.

Preferably, since the engagement oil pressure is reduced in the shift ending period by the control device for a power transmission device, when the input shaft rotation speed of the stepped shifting mechanism is controlled by the electric motor in the shift ending period, the engagement oil pressure is reduced and the torque capacity is lowered in the friction engagement elements to be engaged by the shift and, therefore, the engagement shock can be reduced when the friction engagement devices are engaged in the stepped shifting mechanism, thereby reducing the shift shock.

Preferably, since the reduction of the engagement oil pressure is performed by reducing or retaining the engagement oil pressure or relaxing the oil pressure gradient, when the input shaft rotation speed of the stepped shifting mechanism is controlled by the electric motor in the shift ending period, the engagement oil pressure is reduced by reducing or retaining the engagement oil pressure or relaxing the oil pressure gradient; therefore, the torque capacity is lowered in the friction engagement elements to be engaged by the shift; and, as a result, the engagement shock can be reduced when the friction engagement devices are engaged in the stepped shifting mechanism, thereby reducing the shift shock.

Preferably, since the reduction amount of the reduction of the engagement oil pressure is set based on at least one of the drag of the stepped shifting mechanism, the input shaft rotational acceleration of the stepped shifting mechanism, the vehicle speed, and the regenerative amount of the electric motor, the reduction amount of the engagement oil pressure is set depending on the vehicle state at the time of change from a period before the shift end period while the shift is progressed through the hydraulic control to the shift ending period while the input shaft rotation speed of the stepped shifting mechanism is controlled by the electric motor and, therefore, the engagement shock can appropriately be reduced at the time of engagement of the friction engagement devices depending on the vehicle traveling state, thereby reducing the shift shock.

Preferably, the control of the input shaft rotation speed of the stepped shifting mechanism by the electric motor is performed by the feedback control based on a value of the input shaft rotation speed. Therefore, since the control of the input shaft rotation speed of the stepped shifting mechanism by the electric motor in the shift ending period is performed by the feedback control based on a value of the input shaft rotation speed, the engagement shock can appropriately be reduced at the time of engagement of the friction engagement devices, thereby reducing the shift shock.

Preferably, since the power transmission device has the differential portion coupled to the stepped shifting mechanism in a power transmittable manner and the differential portion includes the planetary gear device and has the first element enabled to transmit the input from the engine, the second element coupled to the first electric motor, and the third element enabled to transmit power to the stepped shifting mechanism and the second electric motor, and the electric motor corresponds to the first electric motor or the second electric motor. Accordingly, since the second electric motor is coupled to the third element enabled to transmit power to the stepped shifting mechanism and the second electric motor and, therefore, the input shaft rotation speed of the stepped shifting mechanism can easily be controlled by the second electric motor, in addition to the effect described above.

Preferably, since the differential portion operates as an electric stepless shifting portion that has a gear ratio of the input shaft and the output shaft controlled by controlling the operation states of the first electric motor and the second electric motor, the gear ratio of the differential portion can continuously be varied by controlling the operation states of the first electric motor and the second electric motor, in addition to the effect described above.

Preferably, in the case of limiting the output of the second electric motor, the control of the input shaft rotation speed of the stepped shifting mechanism in the shift ending period is implemented by the first electric motor and, therefore, if the output of the second electric motor is limited, the control of the input shaft rotation speed of the stepped shifting mechanism in the shift ending period can be implemented by the first electric motor connected via the differential portion.

Preferably, since the case of limiting the output of the second electric motor corresponds to the case of limiting the input/output of the electric storage device, even if the input/output of the electric storage device is limited, and the output of the second electric motor is limited, the control of the input shaft rotation speed of the stepped shifting mechanism in the shift ending period can be implemented.

Preferably, since the case of limiting the output of the second electric motor corresponds to the case that the temperature of the second electric motor is out of a predetermined range defined in advance, even if the output of the second electric motor is limited because the temperature of the second electric motor is out of a predetermined range defined in advance, the control of the input shaft rotation speed of the stepped shifting mechanism in the shift ending period can be implemented.

MODES FOR CARRYING OUT THE INVENTION

Embodiments of the present invention will now be described in detail with reference to the drawings.

First Embodiment

Figures 1, 2:
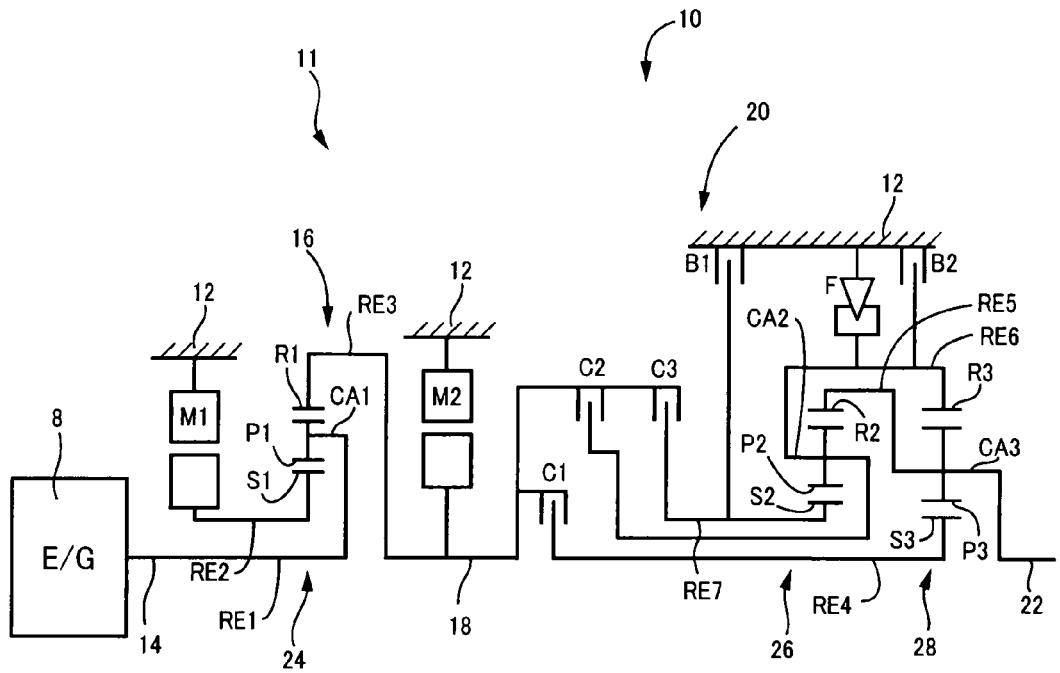
FIG. 1 is a diagram for explaining an example of a configuration of a power transmission device to which the present invention is applied.
FIG. 2 is an operation chart for explaining a relationship between a shifting operation in an automatic shifting portion of the power transmission device of FIG. 1 and a combination of operations of hydraulic friction engagement devices used for the shifting operation.

FIG. 1 is a schematic for explaining a power transmission device 10 making up a portion of a drive device of a hybrid vehicle to which the present invention is applied. In FIG. 1, the power transmission device 10 includes, in series, an input shaft 14 as an input rotating member disposed on a common shaft center in a transmission case 12 (hereinafter, a case 12) that is a non-rotating member attached to a vehicle body; a differential portion 11 as a stepless shifting portion coupled to the input shaft 14 directly or indirectly via a pulsation absorbing damper (pulsation damping device) not depicted; an automatic shifting portion 20 as a power transmitting portion serially coupled via a transmitting member 18 on a power transmission path from the differential portion 11 to drive wheels 38 (see FIG. 6); and an output shaft 22 as an output rotating member coupled to the automatic shifting portion 20. The power transmission device 10 is preferably used for, for example, an FR (front-engine rear-drive) type vehicle with the power transmission device 10 longitudinally placed in the vehicle, and is disposed between an engine (prime mover) 8 that is, for example, an internal combustion engine such as a gasoline engine or a diesel engine as a drive source for traveling coupled to the input shaft 14 directly or indirectly via the pulsation absorbing damper not depicted and a pair of the drive wheels 38 (see FIG. 6) to transmit power from the engine 8 sequentially through a differential gear device (final reduction device) 36 (see FIG. 6) making up a portion of the power transmission path and a pair of axles etc., to a pair of the drive wheels 38. The case 12 of this embodiment corresponds to a non-rotating member of the present invention and the automatic shifting portion 20 corresponds to a stepped shifting mechanism of the present invention. The power transmission device 10 has a substantially vertically symmetric configuration and the lower half is not depicted in FIG. 1.

In the power transmission device 10 of this embodiment, the engine 8 is directly coupled to the differential portion 11. This direct coupling means that the coupling is achieved without the intervention of a fluid type power transmission device such as a torque converter or a fluid coupling and this coupling includes, for example, a coupling through the pulsation absorbing damper.

The differential portion 11 includes a first electric motor M1, a power distribution mechanism 16 that is a mechanical mechanism mechanically distributing the output of the engine 8 coupled to the input shaft 14 as a differential mechanism distributing the output of the engine 8 to the first electric motor M1 and the transmitting member 18, and a second electric motor M2 operatively coupled to rotate integrally with the transmitting member 18. Although the first electric motor M1 and the second electric motor M2 of this embodiment are so-called motor generators that have an electric generation function, the first electric motor M1 at least includes a generator (electric generation) function for generating a reaction force and the second electric motor M2 at least includes a motor (electric motor) function for outputting a drive force as a drive source for traveling. The power distribution mechanism 16 of this embodiment corresponds to a differential portion of the present invention. The first electric motor M1 and the second electric motor M2 correspond to electric motors of the present invention.

The power distribution mechanism 16 is made up mainly of a single pinion type first planetary gear device 24 having a predetermined gear ratio $\rho 1$. The first planetary gear device 24 includes a first sun gear S1, a first planetary gear P1, a first carrier CA1 that supports the first planetary gear P1 in a rotatable and revolvable manner, and a first ring gear R1 engaging with the first sun gear S1 via the first planetary gear P1, as rotating elements. When ZS1 denotes the number of teeth of the first sun gear S1 and ZR1 denotes the number of teeth of the first ring gear R1, the gear ratio $\rho 1$ is ZS1/ZR1.

In this power distribution mechanism 16, the first carrier CA1 is coupled to the input shaft 14, i.e., the engine 8 to make up a first rotating element RE1; the first sun gear S1 is coupled to the first electric motor M1 to make up a second rotating element RE2; and the first ring gear R1 is coupled to the transmitting member 18 to make up a third rotating element RE3. The power distribution mechanism 16 configured as described above is put into a differential state where a differential action is made operative, i.e., the differential action is achieved by enabling the three rotating elements of the first planetary gear device 24, i.e., the first sun gear S1, the first carrier CA1, and the first ring gear R1 to rotate relative to each other and, therefore, the output of the engine 8 is distributed to the first electric motor M1 and the transmitting member 18, and since the electric energy generated by the first electric motor M1 from a portion of the distributed output of the engine 8 is accumulated and rotationally drives the second electric motor M2, the differential potion 11 (the power distribution mechanism 16) is allowed to function as an electric differential device and, for example, the differential potion 11 is put into a so-called stepless shifting state, and the rotation of the transmitting member 18 is continuously varied regardless of a predetermined rotation of the engine 8. Therefore, the differential portion 11 functions as an electric stepless transmission (electric continuously variable transmission) with a gear ratio $\gamma 0$ (rotation speed $N_{IN}$ of the input shaft 14/rotation speed $N_{18}$ of the transmitting member 18) continuously varied from a minimum value $\gamma 0$min to a maximum value $\gamma 0$max.

The automatic shifting portion 20 is disposed on the power transmission path from the transmitting member 18 to the drive wheels 38, includes a single pinion type second planetary gear device 26, and a single pinion type third planetary gear device 28, and is a planetary-gear type multistage transmission acting as a stepped automatic transmission. The second planetary gear device 26 includes a second sun gear S2, a second planetary gear P2, a second carrier CA2 that supports the second planetary gear P2 in a rotatable and revolvable manner, and a second ring gear R2 engaging with the second sun gear S2 via the second planetary gear P2 and has a predetermined gear ratio $\rho 2$. The third planetary gear device 28 includes a third sun gear S3, a third planetary gear P3, a third carrier CA3 that supports the third planetary gear P3 in a rotatable and revolvable manner, and a third ring gear R3 engaging with the third sun gear S3 via the third planetary gear P3 and has a predetermined gear ratio $\rho 3$. When ZS2, ZR2, ZS3, and ZR3 respectively denote the number of teeth of the second sun gear S2, the number of teeth of the second ring gear R2, the number of teeth of the third sun gear S3, and the number of teeth of the third ring gear R3, the gear ratio $\rho 2$ is ZS2/ZR2 and the gear ratio $\rho 3$ is ZS3/ZR3.

In the automatic shifting portion 20, the second sun gear S2 is coupled to the transmitting member 18 via a third clutch C3 and is selectively coupled to the case 12 via a first brake B1; the second carrier CA2 and the third ring gear R3 are integrally coupled to each other, are coupled to the transmitting member 18 via a second clutch C2, and are selectively coupled to the case 12 via a second brake B2; the second ring gear R2 and the third carrier CA3 are integrally coupled to each other and are coupled to the output shaft 22; and the third sun gear S3 is selectively coupled to the transmitting member 18 via a first clutch C1. The second carrier CA2 and the third ring gear R3 are coupled to the case 12 that is a non-rotating member via a unidirectional clutch F to allow rotation in the same direction as the engine 8 and to prohibit rotation in the opposite direction. As a result, the second carrier CA2 and the third ring gear R3 act as rotating members unable to rotate reversely.

In the automatic shifting portion 20, a clutch-to-clutch shift is executed by the release of release-side engagement devices and the engagement of engagement-side engagement devices and a plurality of gear stages (shift stages) are selectively established to acquire a gear ratio $\gamma$ (=rotation speed $N_{18}$ of the transmitting member 18/rotation speed $N_{OUT}$ of the output shaft 22) varying in substantially equal ratio for each gear stage. For example, as depicted in an engagement operation table of FIG. 2, a first speed gear stage is established by the engagement of the first clutch C1 and the unidirectional clutch F; a second speed gear stage is established by the engagements of the first clutch C1 and the first brake B1; a third speed gear stage is established by the engagement of the first clutch C1 and the second clutch C2; a fourth speed gear stage is established by the engagements of the second clutch C2 and the first brake B1; and a reverse gear stage is established by the engagement of the third clutch C3 and the second brake B2. A neutral "N" state is achieved by releasing the first clutch C1, the second clutch C2, the third clutch C3, the first brake B1, and the second brake B2. At the time of engine braking in the first speed gear stage, the second brake B2 is engaged.

The power transmission path in the automatic shifting portion 20 is switched between a power transmittable state that enables the power transmission through the power transmission path and a power transmission interrupting state that interrupts the power transmission in accordance with a combination of the engagement and release operations of the first clutch C1, the second clutch C2, the third clutch C3, the first brake B1, and the second brake B2. When any one of the first to fourth speed gear stages and the reverse gear stage is established, the power transmission path is put into the power transmittable state and when no gear stage is established, for example, when the neutral "N" state is established, the power transmission path is put into the power transmission interrupting state.

The first clutch C1, the second clutch C2, the third clutch C3, the first brake B1, and the second brake B2 (hereinafter, simply, clutches C and brakes B if not particularly distinguished) are hydraulic friction engagement devices as engagement elements frequently used in conventional vehicle automatic transmissions and are made up as a wet multi-plate type having a hydraulic actuator pressing a plurality of friction plates overlapped with each other or as a band brake having a hydraulic actuator fastening one end of one or two bands wrapped around an outer peripheral surface of a rotating drum, for the purpose of selectively coupling members on the both sides of the devices interposed therebetween. The oil pressure supplied for actuating the clutches C and the brakes B of this embodiment into the engaged state corresponds to an engagement oil pressure of the present invention.

In the power transmission device 10 configured as described above, a stepless transmission is made up of the differential portion 11 functioning as a stepless transmission and the automatic shifting portion 20. The differential portion 11 and the automatic shifting portion 20 can form the state equivalent to a stepped transmission by performing control such that the gear ratio of the differential portion 11 is kept constant.

Specifically, when the differential portion 11 functions as a stepless transmission and the automatic transmission 20 in series with the differential portion 11 functions as a stepped transmission, the rotation speed input to the automatic shifting portion 20 (hereinafter, input rotation speed of the automatic shifting portion 20), i.e., the rotation speed of the transmitting member 18 (hereinafter, transmitting member rotation speed $N_{18}$) is varied in a stepless manner for at least one gear stage M of the automatic shifting portion 20, and a stepless gear ratio width is acquired in the gear stage M. Therefore, a general gear ratio γT (=rotation speed $N_{IN}$ of the input shaft 14/rotation speed $N_{OUT}$ of the output shaft 22) of the power transmission device 10 is acquired in a stepless manner and a stepless transmission is formed in the power transmission device 10. The general gear ratio γT of the power transmission device 10 is a total gear ratio γT of the whole of the power transmission device 10 formed based on the gear ratio γ0 of the differential portion 11 and the gear ratio γ of the automatic shifting portion 20.

For example, the transmitting portion rotation speed $N_{18}$ is varied in a stepless manner for each gear stage of the first to fourth speed gear stages and the reverse gear stage of the automatic shifting portion 20 depicted in the engagement operation table of FIG. 2 and a stepless gear ratio width is acquired in each gear stage. Therefore, a gear ratio continuously variable in a stepless manner is achieved between the gear stages and the total gear ratio γT is acquired in a stepless manner for the whole of the power transmission device 10.

When the gear ratio of the differential portion 11 is controlled to be kept constant and the clutches C and the brakes B are selectively engaged and actuated to selectively establish any one of the first to fourth speed gear stages or the reverse gear stage (reverse shift stage), the total gear ratio γT of the power transmission device 10 varying in substantially equal ratio is acquired for each gear stage. Therefore, the state equivalent to a stepped transmission is formed in the power transmission device 10.

Figure 3:
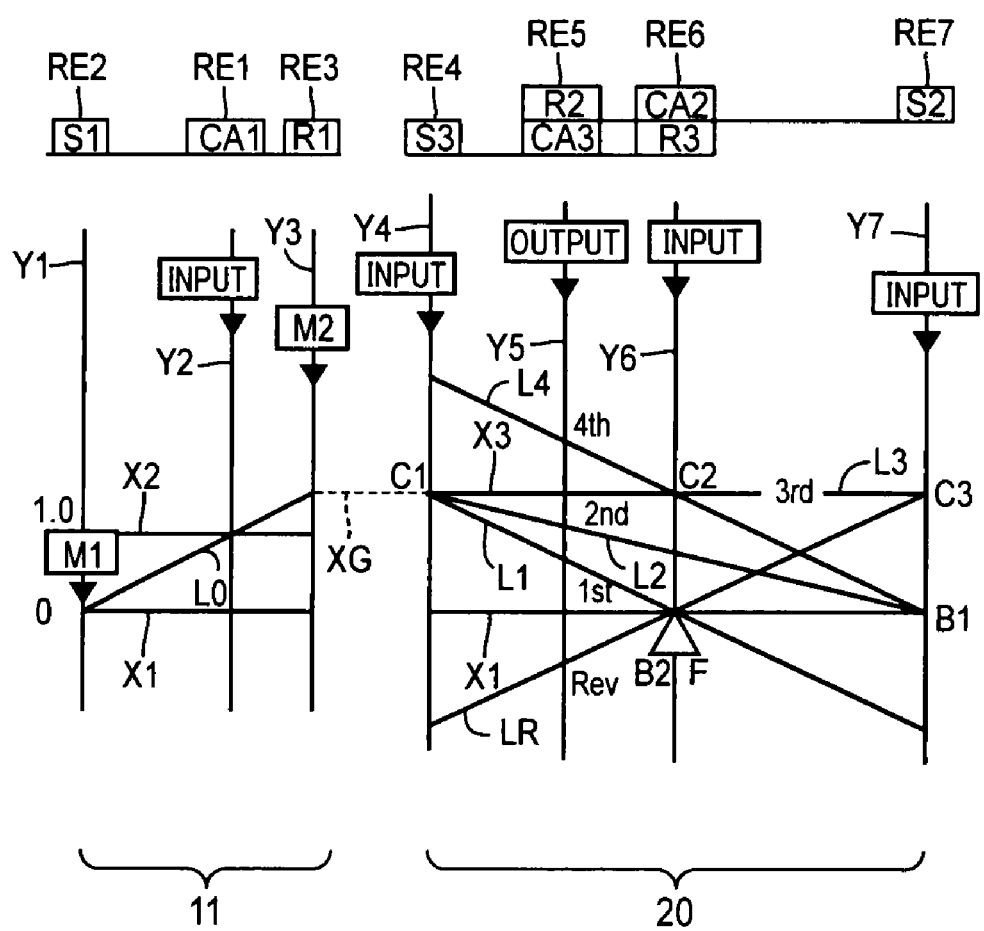
FIG. 3 is a collinear diagram for explaining relative rotation speeds of gear stages when the power transmission device of FIG. 1 is driven to perform a stepped shifting operation.

FIG. 3 depicts a collinear diagram capable of representing on straight lines the relative relationships of the rotation speeds of the rotating elements having a different coupling state for each gear stage in the power transmission device 10 made up of the differential portion 11 and the automatic shifting portion 20. The collinear diagram of FIG. 3 represents two-dimensional coordinates defined by a horizontal axis indicative of a relationship of the gear ratios ρ of the planetary gear devices 24, 26, and 28 and a vertical axis indicative of a relative rotation speed and, a lower horizontal line X1 of three horizontal lines indicates a zero rotation speed; an upper horizontal line X2 indicates a rotation speed "1.0", i.e., a rotation speed $N_E$ of the engine 8 coupled to the input shaft 14; and X3 indicates a rotation speed of the third rotating element RE3 described later input from the differential portion 11 to the automatic shifting portion 20.

Three vertical lines Y1, Y2, and Y3 corresponding to the three elements of the power distribution mechanism 16 making up the differential portion 11 indicate relative rotation speeds of the first sun gear S1 corresponding to the second rotating element RE2, the first carrier CA1 corresponding to the first rotating element RE1, and the first ring gear R1 corresponding to the third rotating element RE3 in the order from left to right, and the intervals between the lines are determined depending on the gear ratio ρ1 of the first planetary gear device 24. Four vertical lines Y4, Y5, Y6, and Y7 of the automatic shifting portion 20 respectively represents the third sun gear S3 corresponding to a fourth rotating element RE4, the second ring gear R2 and the third carrier CA3 mutually-coupled and corresponding to a fifth rotating element RE5, the second carrier CA2 and the third ring gear R3 mutually-coupled and corresponding to a sixth rotating element RE6, and the second sun gear S2 corresponding to a seventh rotating element RE7 in the order from left to right, and the intervals between the lines are determined depending on the gear ratios ρ2 and ρ3 of the second and third planetary gear devices 26 and 28. In the relationship between the vertical axes of the collinear diagram, when an interval corresponding to "1" is defined between a sun gear and a carrier, an interval corresponding to the gear ratio ρ of a planetary gear device is defined between the carrier and a ring gear. Therefore, in the case of the differential portion 11, the interval corresponding to "1" is set between the vertical line Y1 and Y2, and the interval between the vertical lines Y2 and Y3 is set to the interval corresponding to the gear ratio ρ1. In the case of the automatic shifting portion 20, the interval corresponding to "1" is set between the sun gear and the carrier of each of the second and third planetary gear devices 26 and 28, and the interval corresponding to ρ is set between the carrier and the ring gear.

When the power transmission device 10 of this example is represented by using the collinear diagram of FIG. 3, the first rotating element RE1 (the first carrier CA1) of the first planetary gear device 24 is coupled to the input shaft 14, i.e., the engine 8 in the power distribution mechanism 16 (the differential portion 11); the second rotating element RE2 is coupled to the first electric motor M1; the third rotating element RE3 (the first ring gear R1) RE3 is coupled to the transmitting member 18 and the second electric motor M2; and the rotation of the input shaft 14 is configured to be transmitted (input) via the transmitting member 18 to the automatic shifting portion 20. A diagonal line L0 passing through the intersection point of Y2 and X2 indicates the relationship between the rotation speed of the first sun gear S1 and the rotation speed of the first ring gear R1.

For example, the differential portion 11 is put into a differential state where the first rotating element RE1 to the third rotating element RE3 are enabled to rotate relative to each other and, if the rotation speed of the first ring gear R1 indicated by the intersecting point between the line L0 and the vertical line Y3 is restricted and kept substantially constant by the vehicle speed V, when the rotation speed of the first electric motor M1 is controlled to increase or decrease the rotation of the first sun gear S1 indicated by the intersecting point between the line L0 and the vertical line Y1, the rotation speed of the first carrier CA1 indicated by the intersecting point between the line L0 and the vertical line Y2, i.e., the engine rotation speed $N_E$ is increased or decreased.

When the rotation speed of the first electric motor M1 is controlled such that the gear ratio γ0 of the differential portion 11 is fixed to "1" to set the rotation of the first sun gear S1 to the same rotation as the engine rotation speed $N_E$, the line L0 is matched to the horizontal line X2, and the rotation speed of the first ring gear R1, i.e., the transmitting member 18 is rotated at the same rotation as the engine rotation speed $N_E$. Alternatively, when the rotation speed of the first electric motor M1 is controlled such that the gear ratio γ0 of the differential portion 11 is fixed to a value smaller than "1", for example, about 0.7 to set the rotation of the first sun gear S1 to zero, the line L0 is put into the state depicted in FIG. 3, and the transmitting member 18 is rotated at a speed increased from the engine rotation speed $N_E$.

In the automatic shifting portion 20, the fourth rotating element RE4 is selectively coupled to the transmitting member 18 via the first clutch C1; the fifth rotating element RE5 is coupled to the output shaft 22; the sixth rotating element RE6 is selectively coupled to the transmitting member 18 via the second clutch C2 and also selectively coupled to the case 12 via the second brake B2; and the seventh rotating element RE7 is selectively coupled to the transmitting member 18 via the third clutch C3 and also selectively coupled to the case 12 via the first brake B1.

In the automatic shifting portion 20, for example, when the rotation speed of the first electric motor M1 is controlled to set the rotation of the first sun gear S1 to substantially zero in the differential portion 11, the line L0 is put into the state depicted in FIG. 3, and the rotation speed is increased from the engine rotation speed $N_E$ and output to the third rotating element RE3. As depicted in FIG. 3, when the first clutch C1 and the second brake B2 are engaged, the rotation speed of the output shaft 22 at a first speed is indicated by the intersecting point between a diagonal line L1 that passes through the intersecting point between the vertical line Y4 indicative of the rotation speed of the fourth rotating element RE4 and the horizontal line X3 and the intersecting point between the vertical line Y6 indicative of the rotation speed of the sixth rotating element RE6 and the horizontal line X1, and the vertical line Y5 indicative of the rotation speed of the fifth rotating element RE5 coupled to the output shaft 22. Similarly, the rotation speed of the output shaft 22 at a second speed is indicated by the intersecting point between a diagonal line L2 determined by engaging the first clutch C1 and the first brake B1 and the vertical line Y5 indicative of the rotation speed of the fifth rotating element RE5 coupled to the output shaft 22; the rotation speed of the output shaft 22 at a third speed is indicated by the intersecting point between a horizontal line L3 determined by engaging the first clutch C1 and the second clutch C2 and the vertical line Y5 indicative of the rotation speed of the fifth rotating element RE5 coupled to the output shaft 22; and the rotation speed of the output shaft 22 at a fourth speed is indicated by the intersecting point between a diagonal line L4 determined by engaging the second clutch C2 and the first brake B1 and the vertical line Y5 indicative of the rotation speed of the fifth rotating element RE5 coupled to the output shaft 22.

Figure 4:
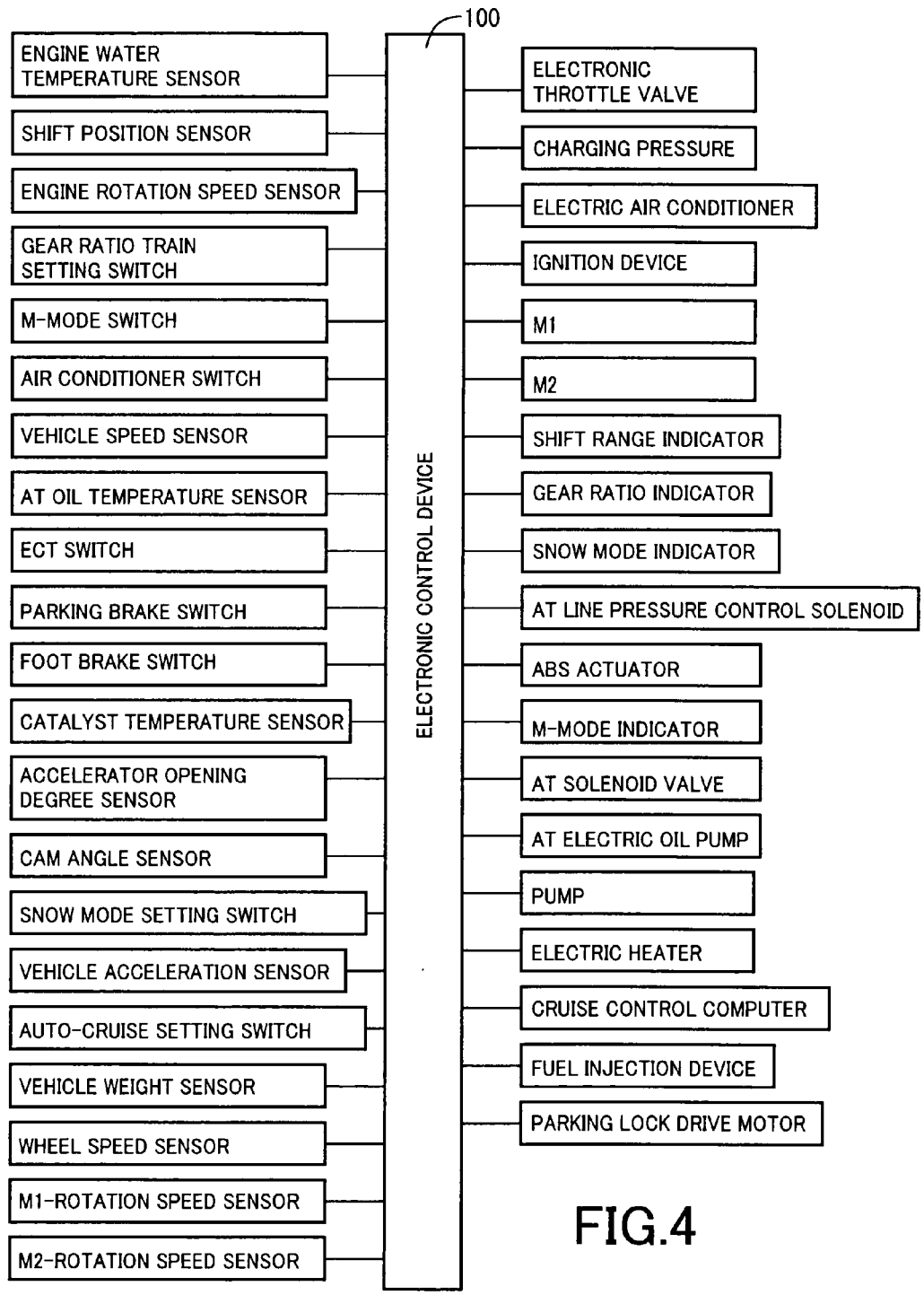
FIG. 4 is a diagram for explaining input/output signals of an electronic control device disposed on the power transmission device of FIG. 1.

FIG. 4 exemplarily illustrates signals input to an electronic control device 100 that is a control device of the power transmission device 10 of this embodiment and signals output from the electronic control device 100. The electronic control device 100 includes a so-called microcomputer made up of CPU, ROM, RAM, I/O interface, etc., and executes signal processes in accordance with programs stored in advance in the ROM, while utilizing a temporary storage function of the RAM, to execute drive controls such as the hybrid drive control related to the engine 8 and the first and second electric motors M1 and M2 and the shift control of the automatic shifting portion 20.

The electronic control device 100 is supplied, from sensors, switches, etc., as depicted in FIG. 4, with a signal indicative of an engine water temperature $TEMP_W$, signals indicative of a shift position $P_{SH}$ of a shift lever 52 (see FIG. 5) and the number of operations at an "M" position, a signal indicative of the engine rotation speed $N_E$ that is the rotation speed of the engine 8, a signal indicative of a gear ratio train setup value; a signal giving a command for an M-mode (manual shift traveling mode), a signal indicative of an operation state A/C of an air conditioner, a signal indicative of a vehicle speed V corresponding to the rotation speed (hereinafter, output shaft rotation speed) $N_{OUT}$ of the output shaft 22, a signal indicative of an operating oil temperature $T_{OIL}$ of the automatic shifting portion 20, a signal indicative of a parking brake operation, a signal indicative of a foot brake operation, a signal indicative of a catalyst temperature, a signal indicative of an accelerator opening degree Acc that is an amount of an accelerator pedal operation corresponding to an output request amount of a driver, a signal indicative of a cam angle, a signal indicative of a snow mode setup, a signal indicative of longitudinal acceleration G of a vehicle, a signal indicative of auto-cruise travelling, a signal indicative of a weight of a vehicle (vehicle weight), a signal indicative of a wheel speed for each of wheels, a signal indicative of a rotation speed $N_{M1}$ (hereinafter, first electric motor rotation speed $N_{M1}$) of the first electric motor M1, a signal indicative of a rotation speed $NM_2$ (hereinafter, second electric motor rotation speed $N_{M2}$) of the second electric motor M2, a signal indicative of a temperature $T_{M2}$ of the second electric motor M2, a signal indicative of a charging capacity (charging state) SOC of an electric storage device 60 (see FIG. 6), etc.

The electronic control device 100 outputs control signals to an engine output control device 43 (see FIG. 6) that controls engine output, for example, a drive signal to a throttle actuator 97 that operates a throttle valve opening degree $\theta_{TH}$ of an electronic throttle valve 96 disposed in an induction pipe 95 of the engine 8, a fuel supply amount signal that controls a fuel supply amount into the induction pipe 95 or the cylinders of the engine 8 from a fuel injection device 98, an ignition signal that gives a command for the timing of the ignition of the engine 8 by an ignition device 99, a charging pressure adjusting signal for adjusting a charging pressure, an electric air conditioner drive signal for activating an electric air conditioner, command signals that gives commands for the operations of the electric motors M1 and M2, a shift position (operational position) display signal for activating a shift indictor, a gear ratio display signal for displaying a gear ratio, a snow mode display signal for displaying that the snow mode is in operation, an ABS activation signal for activating an ABS actuator that prevents wheels from slipping at the time of braking, an M-mode display signal for displaying that the M-mode is selected, a valve command signal for activating an electromagnetic valve (linear solenoid valve) included in a hydraulic control circuit 42 (see FIG. 6) so as to control the hydraulic actuator of the hydraulic friction engagement devices of the differential portion 11 and the automatic shifting portion 20, a signal for regulating a line oil pressure $P_L$ with a regulator valve (pressure regulating valve) disposed in the hydraulic control circuit 42, a drive command signal for activating an electric hydraulic pump that is an oil pressure source of an original pressure for regulating the line oil pressure $P_L$, a signal for driving an electric heater, a signal to a computer for controlling the cruise control, a signal for driving a parking lock drive motor, etc.

Figure 5:
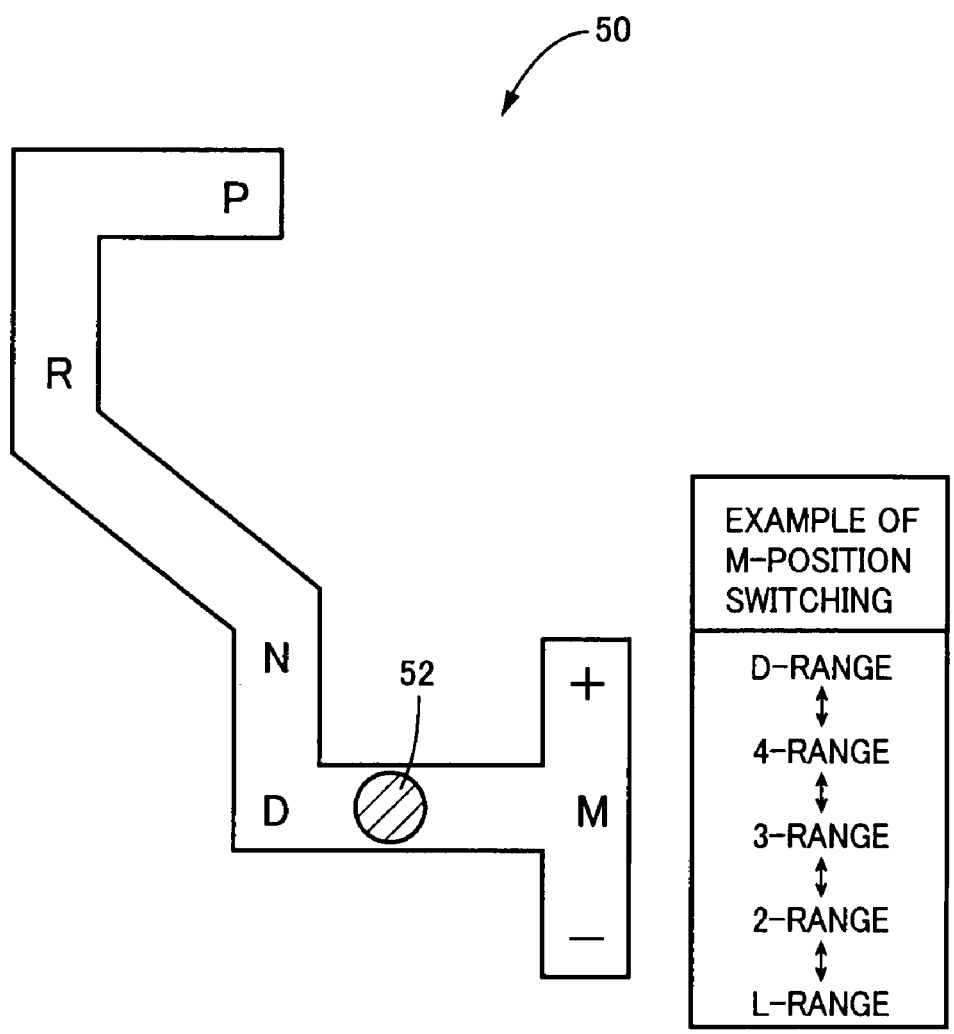
FIG. 5 is a diagram of an example of a shift operation device including a shift lever and operated for selecting a plurality of types of shift positions.

FIG. 5 is a diagram of an example of a shift operation device 50 as a switching device that switches a plurality of types of shift positions $P_{SH}$ through artificial manipulation. The shift operation device 50 is disposed next to a driver's seat, for example, and includes the shift lever 52 operated so as to select a plurality of types of the shift positions $P_{SH}$.

The shift lever 52 is arranged to be manually operated to a parking position "P (parking)" for being in a neutral state, i.e., neutral state with the power transmission path interrupted in the power transmission device 10, i.e., in the automatic shifting portion 20 and for fixing in a non-rotatable manner (i.e., locking) the output shaft 22 of the automatic shifting portion 20; a backward traveling position "R (reverse)" for backward traveling; a neutral position "N (neutral)" for being in the neutral state with the power transmission path interrupted in the power transmission device 10; a forward automatic transmission traveling position "D (drive)" for achieving an automatic transmission mode to execute the automatic transmission control within an available variation range of the total gear ratio γT of the power transmission device 10 acquired from a stepless gear ratio width of the differential portion 11 and the gear stages subjected to the automatic transmission control within the range of the first speed gear stage to the fourth speed gear stage of the automatic shifting portion 20; or a forward manual transmission traveling position "M (manual)" for achieving a manual transmission traveling mode (manual mode) to set a so-called shift range that limits shift stages on the high-speed side in the automatic shifting portion 20.

A hydraulic control circuit is electrically switched by, for example, a so-called shift-by-wire system that switches a power transmission state of the power transmission device 10 through electric control such that the reverse gear stage "R", the neutral "N", the shift stages in the forward gear stage "D", etc., depicted in the engagement operation table of FIG. 2 are established in conjunction with the manual operation of the shift lever 52 to the shift positions $P_{SH}$.

Among the shift positions $P_{SH}$ indicated by the "P" to "M" positions, the "P" position and the "M" position are the non-traveling positions selected when a vehicle does not travel and are the non-driving positions for selecting the switch-over to the power transmission interrupting state of the power transmission path such that a vehicle with the power transmission path interrupted in the automatic shifting portion 20 cannot be driven. The "R" position, the "D" position, and the "M" position are the travelling positions selected when a vehicle travels and are the driving positions for selecting the switch-over to the power transmittable state of the power transmission path such that a vehicle with the power transmission path coupled in the automatic shifting portion 20 can be driven.

Specifically, when the shift lever 52 is manually operated to the "P" position, all the clutches C and the brakes B are released to put the power transmission path in the automatic shifting portion 20 into the power transmission interrupting state and the output shaft 22 of the automatic shifting portion 20 is locked; when the shift lever 52 is manually operated to the "N" position, all the clutches C and the brakes B are released to put the power transmission path in the automatic shifting portion 20 into the power transmission interrupting state; and when the shift lever 52 is manually operated to one of the "R", "D", and "M" positions, one gear stage corresponding to the position is established to put the power transmission path in the automatic shifting portion 20 into the power transmittable state.

Figure 6:
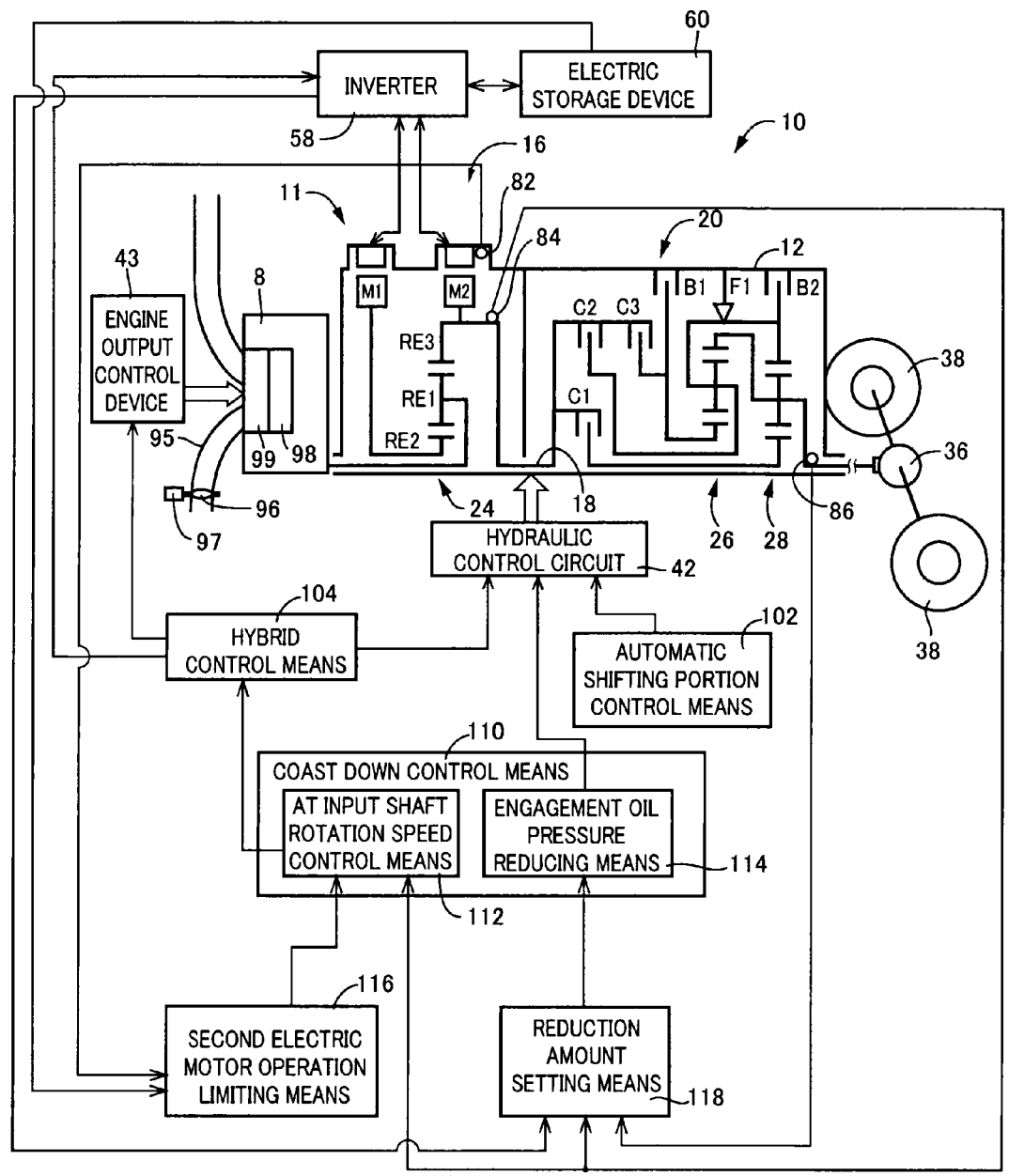
FIG. 6 is a functional block line diagram for explaining a main portion of the control function included in the electronic control device of FIG. 4.
Figure 7:
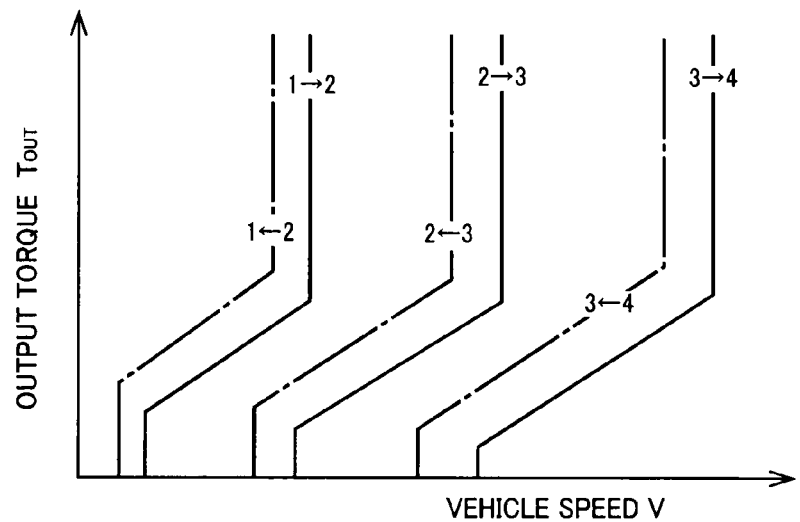
FIG. 7 is a diagram of an example of a shifting line diagram used in the shifting control of the automatic shifting portion.

FIG. 6 is a functional block line diagram for explaining a control function of a control device for the power transmission device 10, which is a portion of the control function of the electronic control device 100. In FIG. 6, an automatic shifting portion control means 102 determines whether a shift of the automatic shifting portion 20 should be executed, i.e., determines a shift stage to be achieved by the shift of the automatic shifting portion 20 based on the vehicle state indicated by an actual vehicle speed V and a request output torque $T_{OUT}$ of the automatic shifting portion 20 in accordance with a relationship (a shifting line diagram, a shifting map) having upshift lines (solid lines) and downshift lines (dashed lines) preliminarily stored using the vehicle speed V and the output torque $T_{OUT}$ of the automatic shifting portion 20 as parameters as depicted in FIG. 7, and performs the automatic transmission control of the automatic shifting portion 20 so as to acquire the determined shift stage.

In this case, the automatic shifting portion control means 102 gives a command (a shift output command, a hydraulic pressure command) for engaging and/or releasing the hydraulic friction engagement devices involved in the shift of the automatic shifting portion 20 such that the shift stage is achieved in accordance with, for example, the engagement operation table depicted in FIG. 2, i.e., actuates the linear solenoid valve in the hydraulic control circuit 42 to actuates the hydraulic actuator of the hydraulic friction engagement devices involved in the shift so as to release the release-side engagement devices involved in the shift of the automatic shifting portion 20 and engage the engagement-side engagement devices for executing the shift of the automatic shifting portion 20.

While operating the engine 8 in an efficient operation range, the hybrid control means 104 changes the drive power distribution between the engine 8 and the second electric motor M2 and a reaction force due to the electric generation by the first electric motor M1 to the optimum state to control the gear ratio γ0 of the differential portion acting as an electric stepless transmission. For example, for a traveling vehicle speed V at a time point, a target output of a vehicle is calculated from the accelerator opening degree Acc that is an output request amount of a driver and the vehicle speed V; a necessary total target output is calculated from the target output and a charge request amount of the vehicle; and a target engine output is calculated such that the total target output is acquired in consideration of a transmission loss, an assist torque of the second electric motor M2, etc., to control the engine 8 and control an electric generation amount of the first electric motor M1 so as to achieve the engine rotation speed $N_E$ and the engine torque $T_E$ for acquiring the target engine output.

Figure 8:
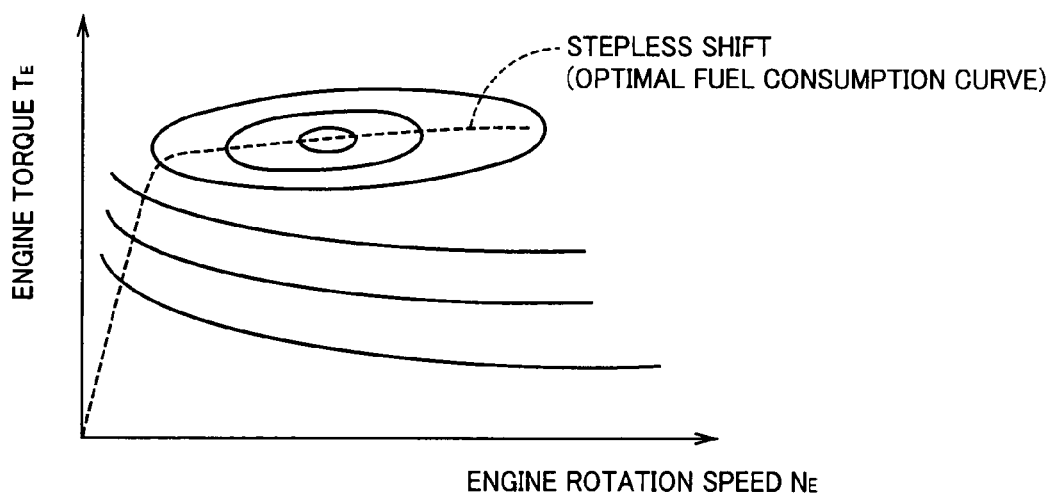
FIG. 8 is a diagram of an example of a fuel consumption map representative of efficiency of an engine, including a broken line for an optimal fuel consumption rate curve.

For example, the hybrid control means 104 performs the control in consideration of the gear stages of the automatic shifting portion 20 for the purpose of improvements of power performance and fuel efficiency. In such hybrid control, the differential portion 11 is driven to function as a stepless transmission to match the engine rotation speed $N_E$ determined for operating the engine 8 in an efficient operation range with the rotation speed of the transmitting member 18 determined from the vehicle speed V and the shift stages of the automatic shifting portion 20. Therefore, the hybrid control means 104 determines a target value of the total gear ratio γT of the power transmission device 10 such that the engine 8 is operated along an optimal fuel consumption rate curve of the engine 8 represented by a broken line of FIG. 8 empirically obtained and stored in advance so as to satisfy both the drivability and the fuel consumption property during travelling with stepless transmission in the two-dimensional coordinates made up of the engine rotation speed $N_E$ and the output torque (engine torque) $T_E$ of the engine 8, for example, such that the engine torque $T_E$ and the engine rotation speed $N_E$ are achieved for generating the engine output necessary for satisfying the target output, and the hybrid control means 104 controls the gear ratio γ0 of the differential portion 11 in consideration of the gear stages of the automatic transmission 30 and controls the total gear ratio γ0 within the available variation range to acquire the target value.

In this case, since the hybrid control means 104 supplies the electric energy generated by the first electric motor M1 to the electric storage device 60 and the second electric motor M2 via an inverter 58, a main portion of the power of the engine 8 is mechanically transmitted to the transmitting member 18 while a portion of the power of the engine 8 is consumed for the electric generation of the first electric motor M1 and converted into electric energy, and the electric energy is supplied through the inverter 58 to the second electric motor M2 to drive the second electric motor M2 and is transmitted from the second electric motor M2 to the transmitting member 18. The equipments related to the electric energy from the generation to the consumption by the second electric motor M2 make up an electric path from the conversion of a portion of the power of the engine 8 into electric energy to the conversion of the electric energy into mechanical energy.

The hybrid control means 104 controls the first electric motor rotation speed $N_{M1}$ and/or the second electric motor rotation speed $N_{M2}$ with the electric CVT function of the differential portion 11 such that the engine rotation speed $N_E$ is maintained substantially constant or rotationally controlled at an arbitrary rotation speed regardless of whether a vehicle is stopped or traveling. In other words, the hybrid control means 104 can rotationally control the first electric motor rotation speed $N_{M1}$ and/or the second electric motor rotation speed $N_{M2}$ at arbitrary rotational speed while maintaining or controlling the engine rotation speed $N_E$ substantially constant or at an arbitrary rotation speed.

For example, as can be seen from the collinear diagram of FIG. 3, if the engine rotation speed $N_E$ is raised while a vehicle is traveling, the hybrid control means 104 raises the first electric motor rotation speed $N_{M1}$ while maintaining the second electric motor rotation speed $N_{M2}$ restricted by the vehicle speed V (the drive wheels 38) substantially constant. If the engine rotation speed $N_E$ is maintained substantially constant during a shift of the automatic shifting portion 20, the hybrid control means 104 changes the first electric motor rotation speed $N_{M1}$ in the direction opposite to the change in the second electric motor rotation speed $N_{M2}$ associated with the shift of the automatic shifting portion 20 while maintaining the engine rotation speed $N_E$ substantially constant.

The hybrid control means 104 functionally includes an engine output control means that outputs commands separately or in combination to the engine output control device 43 to control opening/closing of the electronic throttle valve 96 with the throttle actuator 97 for throttle control, to control a fuel injection amount and an injection timing of the fuel injection device 98 for the fuel injection control, and to control the timing of the ignition by the ignition device 99 such as an igniter for the ignition timing control so as to execute the output control of the engine 8 to generate necessary engine output.

For example, the hybrid control means 104 drives the throttle actuator 97 basically based on the accelerator opening degree Acc in accordance with a preliminarily stored relationship not depicted to execute the throttle control such that the throttle valve opening degree $θ_{TH}$ is increased as the accelerator opening degree Acc increases. The engine output control device 43 executes the engine torque control by controlling opening/closing of the electronic throttle valve 96 with the throttle actuator 97 for the throttle control, controlling the fuel injection by the fuel injection device 98 for the fuel injection control, and controlling the timing of the ignition by the ignition device 99 such as an igniter for the ignition timing control in accordance with the commands from the hybrid control means 104.

The hybrid control means 104 can achieve the motor traveling with the electric CVT function (differential action) of the differential portion 11 regardless of whether the engine 8 is stopped or in the idle state. For example, the hybrid control means 104 performs the motor traveling in a relatively lower output torque $T_{OUT}$ zone, i.e., a lower engine torque $T_E$ zone generally considered as having poor engine efficiency as compared to a higher torque zone, or in a relatively lower vehicle speed zone of the vehicle speed V, i.e., a lower load zone. During the motor traveling, the hybrid control means 104 controls the first electric motor rotation speed $N_{M1}$ at a negative rotation speed, for example, in idling, with the electric CVT function (differential action) of the differential portion 11 to maintain the engine rotation speed $N_E$ at zero or substantially zero as needed with the differential action of the differential portion 11 so as to suppress the drag of the stopped engine 8 and improve the fuel consumption.

The hybrid control means 104 can perform so-called torque assist for complementing the power of the engine 8, even in the engine traveling range, by supplying the electric energy from the first electric motor M1 and/or the electric energy from the electric storage device 60 through the electric path described above to the second electric motor M2 and by driving the second electric motor M2 to apply a torque to the drive wheels.

The hybrid control means 104 interrupts the drive current to the first electric motor M1 supplied via the inverter 58 from the electric storage device 60 to put the first electric motor M1 into the no-load state. The first electric motor M1 is allowed to freely rotate, i.e., idle in the no-load state and the differential portion 11 is put into the state unable to transmit a torque, i.e., the state equivalent to the state with the power transmission path interrupted in the differential portion 11, in which the output from the differential portion 11 is not generated. Therefore, the hybrid control means 104 can put the first electric motor M1 into the no-load state to put the differential portion 11 into the neutral state (neutral state) with the power transmission path electrically interrupted.

The hybrid control means 104 performs the regenerative control with the engine 8 put into the non-driving state to convert kinetic energy of a vehicle transmitted from the drive wheels 38 into the electric energy with the differential portion 11 to improve the fuel consumption (reduce a fuel consumption rate) during the inertia traveling (during coasting) when the acceleration is turned off and at the time of braking by the foot brake and, specifically, the hybrid control means 104 rotationally drives the second electric motor M2 to operate as an electric generator by the kinetic energy of the vehicle, i.e., a reverse drive force transmitted from the drive wheels 38 toward the engine 8 to charge the electric storage device 60 via the inverter 58 with the electric energy, i.e., a current generated by the second electric motor. In other words, the hybrid control means 104 has a function as a regenerative control means that performs the regenerative control and performs the regenerative control when an operational point of the power transmission device 10 is determined based on a state amount indicative of the vehicle state exemplarily indicated by the accelerator opening degree Acc, the vehicle speed V, the brake pedal operation amount, a charge remaining amount SOC of the electric storage device 60, the shift stage of the automatic shifting portion 20, etc., and the operational point belongs to an empirically-defined regenerative range where the regenerative control should be performed. In this regenerative control, the electric energy regenerated by the second electric motor M2, i.e., a regenerative amount of this regenerative control is controlled to achieve a regenerative request amount that is a needed regenerative amount determined based on a charge remaining amount SOC of the electric storage device 60 and the braking force distribution of a braking force from a hydraulic brake for acquiring a braking force corresponding to a brake pedal operation amount.

While the hybrid control means 104 is performing the regenerative control, the automatic shifting portion control means 102 may determine a shift of the automatic shifting portion 20 because a traveling state of a vehicle is changed due to decrease in a vehicle speed, for example. If a downshift of the automatic shifting portion 20 is determined while the regenerative control is in operation as described above, a coast down control means 110 performs the shift of the automatic shifting portion 20 with a method different from the downshift other than that performed while the regenerative control is in operation.

The coast down control means 110 functionally includes an AT input shaft rotation speed control means 112 and an engagement oil pressure reducing means 114. The engagement oil pressure reducing means 114 reduces a value of a supply oil pressure that is an oil pressure supplied to the friction engagement devices to be engaged in the shift of the automatic shifting portion 20, in the ending period of the shift. Specifically, the engagement oil pressure reducing means 114 changes a value of the engagement oil pressure to realize a reduction amount set by a reduction amount setting means 118 described later. With regard to the shift ending period, for example, when a differential rotation speed $\Delta N_{IN}$ between a synchronized rotation speed $N_{IN}^*$, i.e., an input shaft rotation speed of the automatic shifting portion 20 in the shift stage after the shift and an actual input shaft rotation speed $N_{IN}$ of the automatic shifting portion 20 falls below a predetermined value defined in advance such as several hundred rpm, it is considered that the shift is in the ending period.

The reduction amount setting means 118 sets a reduction amount of the engagement oil pressure to be reduced by the engagement oil pressure reducing means 114. Specifically, for example, the reduction amount setting means 118 sets the reduction amount of the engagement oil pressure based on at least one of the drag of the automatic shifting portion 20, a rotational acceleration $\Delta N_{IN}/\Delta t$ of the transmitting member 18 that is the input shaft of the automatic shifting portion 20, the vehicle speed v, and the regenerative amounts of the first electric motor M1 and the second electric motor M2. More specifically, if the drag of the automatic shifting portion 20 is large, a change hardly occurs in the input shaft rotation speed of the automatic shifting portion 20 and, therefore, the reduction amount setting means 118 sets a smaller reduction amount of the engagement oil pressure or a smaller magnitude of the gradient of the reduction amount of the engagement oil pressure as the drag of the automatic shifting portion 20 is larger. If a larger change occurs in the rotational acceleration $\Delta N_{IN}/\Delta t$ of the transmitting member 18 that is the input shaft of the automatic shifting portion 20, the drag of the automatic shifting portion 20 is smaller and, therefore, the reduction amount setting means 118 sets a larger reduction amount of the engagement oil pressure or a larger magnitude of the gradient of the reduction amount of the engagement oil pressure as a larger change occurs in the rotational acceleration $\Delta N_{IN}/\Delta t$ of the transmitting member 18 that is the input shaft of the automatic shifting portion 20. As a result, a shift shock can be alleviated.

Since the shift shock generally tends to be easily felt in a shift at a lower vehicle speed, if the vehicle speed is small, the reduction amount setting means 118 sets a larger reduction amount of the engagement oil pressure or a larger magnitude of the gradient of the reduction amount of the engagement oil pressure as the vehicle speed v is smaller. If the regenerative amounts of the first electric motor M1 and the second electric motor M2 are large, an undershoot may occur in the input shaft rotation speed $N_{IN}$ of the automatic shifting portion 20 when the engagement oil pressure is significantly reduced and, therefore, the reduction amount setting means 118 sets a smaller reduction amount of the engagement oil pressure or a smaller magnitude of the gradient of the reduction amount of the engagement oil pressure as the regenerative amounts are larger. The magnitude of the vehicle speed v is acquired from the rotation speed $N_{OUT}$ of the output shaft 22 of the automatic shifting portion 20 detected by, for example, an output shaft rotation speed sensor 86 in consideration of the gear ratio of the final reduction device 36 and the diameter of the drive wheels 38.

When the reduction amount of the engagement oil pressure is set by the reduction amount setting means 118 in this way, the engagement oil pressure is reduced or retained from the start of the shift ending period or, even when the engagement oil pressure increases, the gradient of the increase is relaxed.

Returning to the coast down control means 110, the AT input shaft rotation speed control means 112 performs control such that a value of the input shaft rotation speed $N_{IN}$ of the automatic shifting portion 20 turns to the synchronized rotation speed $N_{IN}^*$ in the ending period of the shift. Specifically, the AT input shaft rotation speed control means 112 controls the input shaft rotation speed $N_{IN}$ of the automatic shifting portion 20 by driving the hybrid control means 104 to control the output torque of the second electric motor M2. Since the input shaft of the automatic shifting portion 20 is coupled to the second electric motor M2 in this embodiment, the input shaft rotation speed $N_{IN}$ of the automatic shifting portion 20 is equivalent to the rotation speed $N_{M2}$ of the second electric motor M2. The AT input shaft rotation speed control means 112 performs the feedback control based on a value of the rotation speed $N_{M2}$ of the second electric motor M2 detected by a second electric motor rotation speed sensor 84, for example, and controls the input shaft rotation speed $N_{IN}$ of the automatic shifting portion 20 through PID control etc.

If a second electric motor operation limiting means 116 described later determines that a vehicle is in a state that limits the operation of the second electric motor M2, it is considered that the input shaft rotation speed $N_{IN}$ cannot sufficiently be controlled by the regenerative torque acquired from the second electric motor M2 since the regenerative control of the second electric motor M2 is not performed or a limit is set on the regenerative amount even when the regenerative control is performed and, therefore, the AT input shaft rotation speed control means 112 is configured to control the input shaft rotation speed $N_{IN}$ of the automatic shifting portion 20 with a torque generated by the first electric motor M1 instead of the second electric motor M2 or an output torque generated from the second electric motor M2 and the first electric motor M1 by performing the coordinated control of the second electric motor M2 and the first electric motor M1. Since the first electric motor M1 is connected via the rotation elements of the planetary gear device 24 to the transmitting member 18 that is the input shaft of the automatic shifting portion 20 in this embodiment, if the output of the second electric motor M2 is limited, the input shaft rotation speed $N_{IN}$ of the automatic shifting portion 20 can be controlled by the output of the first electric motor M1. In this case, the AT input shaft rotation speed control means 112 drives the hybrid control means 104 to cause the output of the first electric motor in consideration of the gear ratio of the planetary gear device 24 making up the differential portion 11.

The second electric motor operation limiting means 116 determines whether the regenerative control of the second electric motor M2 is performable or whether a limit is set on the regenerative amount, depending on whether a vehicle state corresponds to a condition stored in advance. This condition is, for example, whether the input/output limit is set on the electric storage device 60. More specifically, if the temperature of the electric storage device 60 detected by a temperature sensor not depicted is higher or lower than a predetermined range defined in advance or the state of charge (SOC) of the electric storage device 60 is higher or lower than a predetermined range of charge amount defined in advance, the input/output limit of electric energy is set on the electric storage device 60. If the input/output limit is set on the electric storage device 60 as described above, the regenerative control of the second electric motor M2 is not performed or, even if performed, a limit is set on the regenerative amount. The predetermined range related to the temperature of the electric storage device 60 is a temperature range ensuring that the electric storage device 60 can exhibit sufficient charging/discharging performances, and the range related to the state of charge of the electric storage device 60 is set as a range not causing the overcharge or over discharge of the electric storage device 60.

The condition may be satisfied when the temperature of the second electric motor M2 is higher or lower than a predetermined range defined in advance. The temperature of the second electric motor M2 is detected by a second electric motor temperature sensor 82, for example. The predetermined range related to the temperature of the second electric motor M2 is set as a temperature range ensuring that the second electric motor M2 can exhibit sufficient performance. Therefore, if the second electric motor M2 cannot exhibit sufficient performance, the regenerative control of the second electric motor M2 is not performed or, if performed, a limit is set on the regenerative amount.

Figure 9:
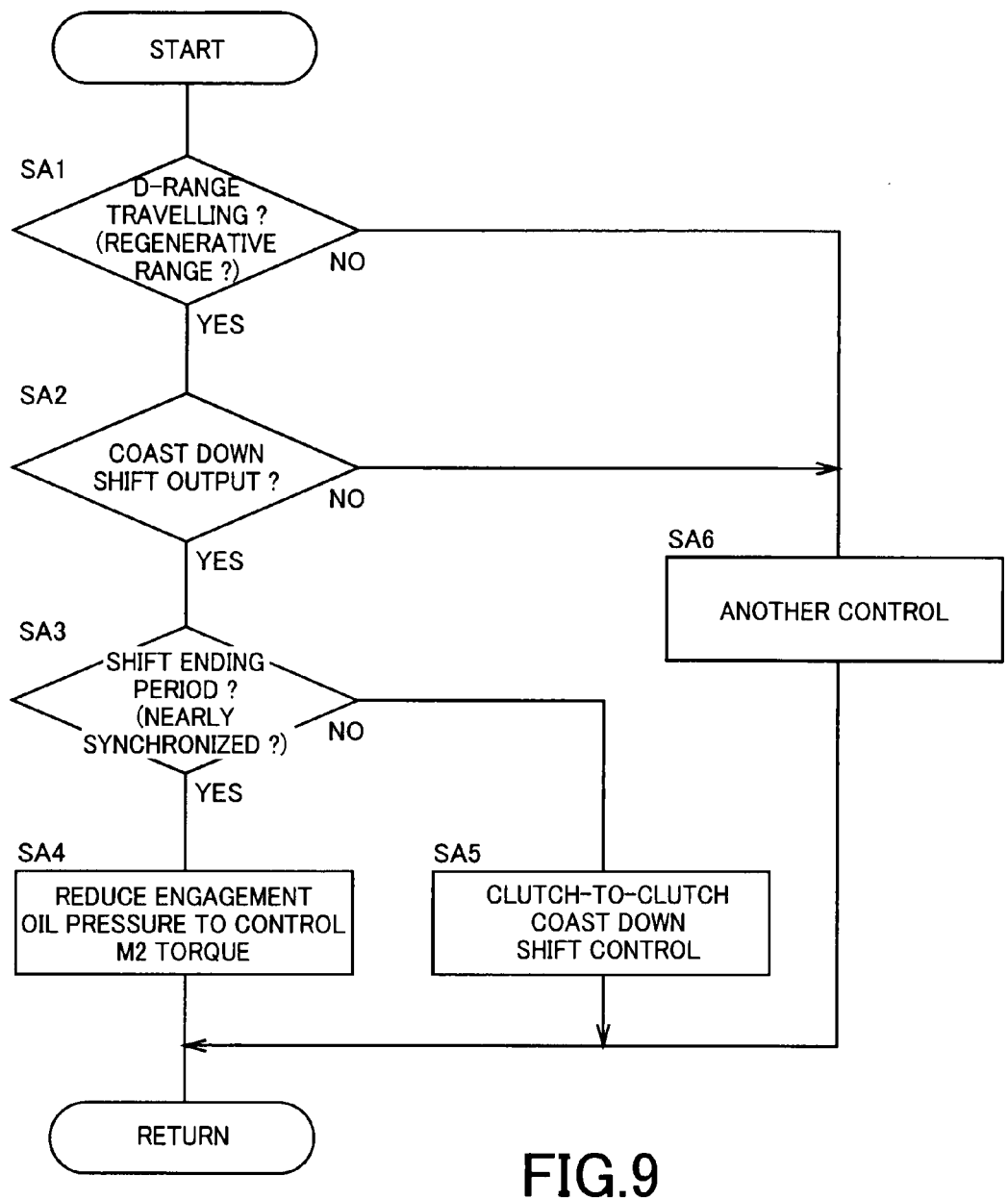
FIG. 9 is a flowchart for explaining an example of a coast down shift control that is a control function of the electronic control device of FIG. 4.

FIG. 9 is a flowchart for explaining a main portion of the control function in the electronic control device 100 of this embodiment, i.e., a function in the coast down shift control when a coast down shift is determined while the regenerative control is in operation.

At SA1 corresponding to the hybrid control means 104 etc., it is determined whether a vehicle is traveling in a regenerative manner. Specifically, for example, if the traveling state of the vehicle is in a regenerative range and the shift range of the automatic shifting portion 20 is the forward traveling range (D range), it is determined that the vehicle is traveling in a regenerative manner. If it is determined that the vehicle is traveling in a regenerative manner, the determination at this step is affirmative and SA2 is executed. If the vehicle is not traveling in a regenerative manner, the determination at this step is negative and SA6 is executed since the coast down shift control of this embodiment is not performed.

At SA2 corresponding to the automatic shifting portion control means 102 etc., it is determined whether the coast down shift is determined. If the coast down shift is determined, the determination at this step is affirmative and SA3 is executed. If the coast down shift is not determined, the determination at this step is negative and SA6 is executed since the coast down shift control of this embodiment is not performed.

SA3 and SA4 correspond to the coast down control means 110. At SA3, it is determined whether the shift of the automatic shifting portion 20 determined to be executed at SA2 enters the shift ending period. This determination is made when a differential rotation speed between a target value $N_{IN}^*$ of the input shaft rotation speed of the automatic shifting portion 20 after the shift and the actual input shaft rotation speed $N_{IN}$ of the automatic shifting portion 20 falls below a threshold value defined in advance. This threshold value defined in advance is set to correspond to a degree of progression of a shift that may generate a shift shock caused by variations of a response of oil pressure and a torque capacity of the friction engagement elements due to variations of an oil temperature of operating oil of the automatic shifting portion 20 and a gap (pack clearance) disposed between the friction engagement elements and a piston when the torque capacity increases in the friction engagement devices to be engaged by the shift of the automatic shifting portion 20. If it is determined that the shift of the automatic shifting portion 20 enters the shift ending period, the determination at this step is affirmative and SA4 is executed. In contrast, if it is determined that the shift of the automatic shifting portion 20 does not yet enter the shift ending period, the determination at this step is negative and SA5 is executed.

SA4 corresponds to the AT input shaft rotation speed control means 112 and the engagement oil pressure reducing means 114 of the coast down control means 110. Therefore, at this step, the magnitude of the supply oil pressure is reduced that is supplied to the friction engagement devices to be engaged by the shift of the automatic shifting portion 20. The output torque of the second electric motor M2 is also controlled such that a value of the input shaft rotation speed $N_{IN}$ of the automatic shifting portion 20 turns to the target value $N_{IN}^*$ of the input shaft rotation speed of the automatic shifting portion 20 after the shift.

At SA5, since the shift of the automatic shifting portion 20 does not yet enter the shift ending period, changes are made in the engagement oil pressure supplied to the friction engagement devices to be engaged by the shift and the release oil pressure supplied to the friction engagement devices to be released by the shift in accordance with a temporal change pattern of oil pressure defined in advance. This oil pressure change pattern defined in advance may be any pattern used in a downshift of the automatic shifting portion 20 regardless of whether during regenerative traveling of a vehicle or not.

At SA6 executed when the determination at SA1 or the determination at SA2 is negative, sine this is not the case of the coast down shift executed during the regenerative traveling of a vehicle, the coast down shift control of this embodiment is not performed and another control is performed. Therefore, control is performed such as shift control of the automatic shifting portion 20 by the automatic shifting portion control means 102 and control of the engine 8, the first electric motor M1, and the second electric motor M2 by the hybrid control means 104 depending on a vehicle state.

Figure 10:
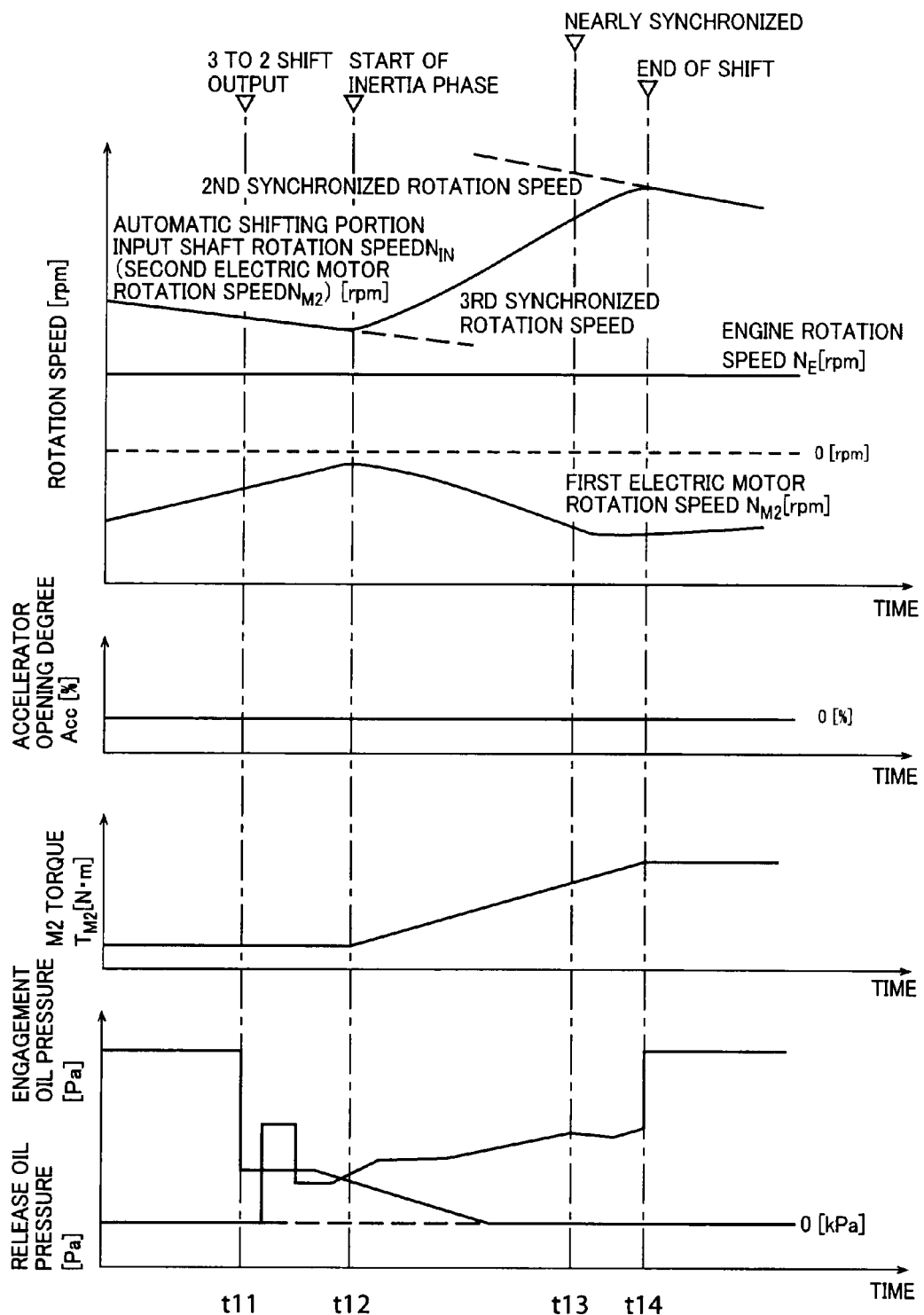
FIG. 10 is a time chart for explaining a temporal change in a vehicle state when a down shift of the automatic shifting portion is determined in the regenerative traveling state of a vehicle, which is a diagram for explaining an example when the coast down shift control of this embodiment is not applied.
Figure 11:
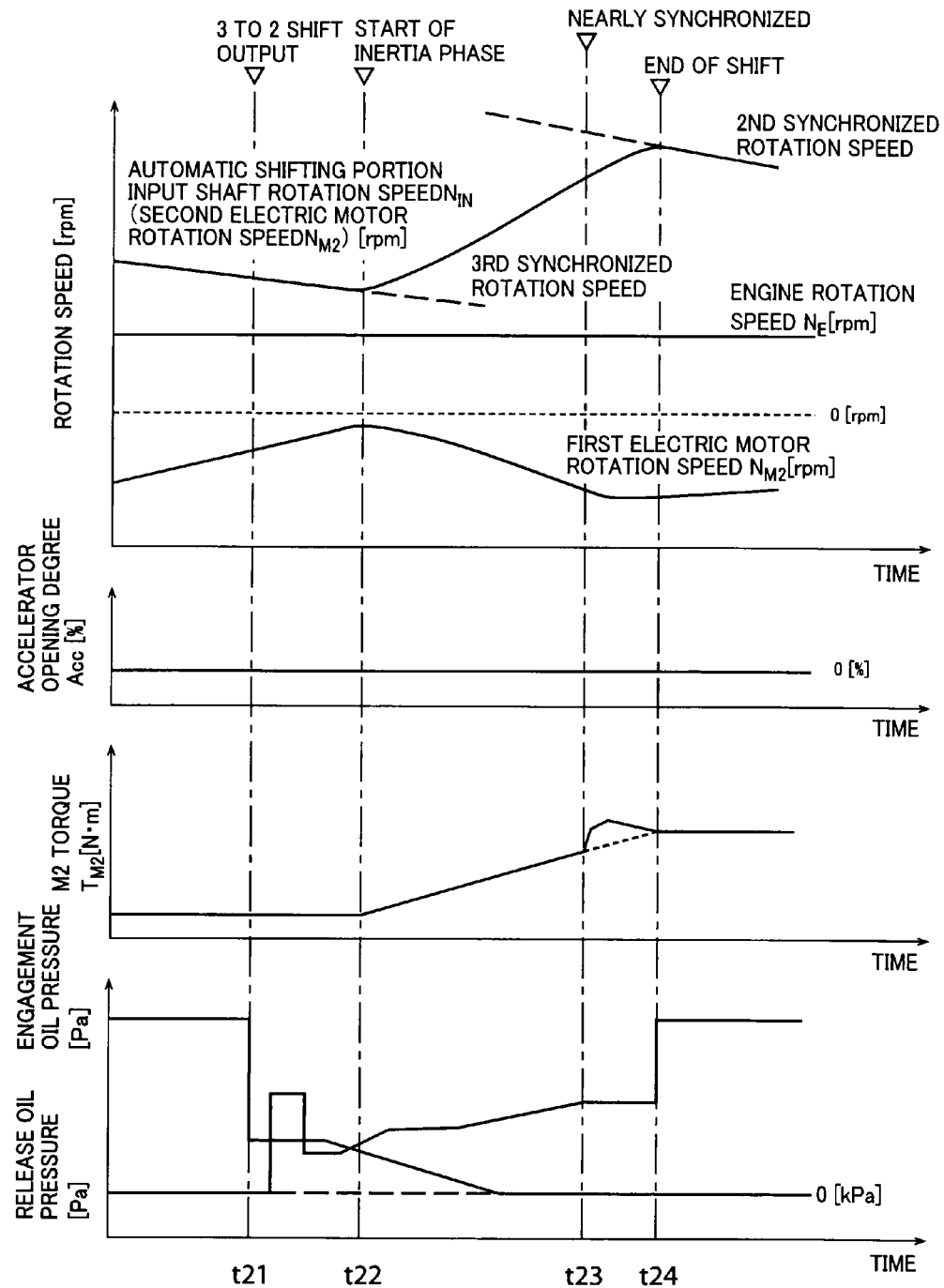
FIG. 11 is a time chart for explaining a temporal change in a vehicle state when a down shift of the automatic shifting portion is determined in the regenerative traveling state of a vehicle, which is a diagram for explaining an example when the coast down shift control of this embodiment is applied.

FIGS. 10 and 11 are time charts using a common time axis to represent temporal changes of the engine rotation speed $N_E$, the rotation speed $N_{M1}$ of the first electric motor M1, the rotation speed $N_{M2}$ of the second electric motor M2, the accelerator opening degree Acc, the output torque $T_{M2}$ of the second electric motor M2, and the engagement oil pressure and the release oil pressure that are oil pressures supplied to the friction engagement devices to be engaged and the friction engagement devices to be released by the shift when the coast down shift is performed during the regenerative traveling of a vehicle. FIG. 10 is a diagram for explaining an example when the coast down shift control of this embodiment is not performed and FIG. 11 is a diagram for explaining an example when the coast down shift control of this embodiment is performed.

First, FIG. 10 will be described. In a time interval depicted in FIG. 10, the accelerator opening degree Acc is set to zero. Therefore, the vehicle is coasting and the regenerative control by the second electric motor M2 is performed.

At time t11, the execution of downshift from the third speed stage to the second speed stage of the automatic shifting portion 20 is determined and output in association with reduction of the vehicle speed v, for example. From time t11 to t12, the release oil pressure is reduced while the engagement oil pressure is increased to a predetermined waiting pressure and then gradually increased.

At time t12, a value of the input shaft rotation speed $N_{IN}$ of the automatic shifting portion 20 starts changing from the synchronized rotation speed of the third speed stage indicated by a broken line in FIG. 10 and gradually increases. In other words, a torque phase is terminated and an inertia phase is started. As the shift subsequently progresses, the torque capacity increases in the friction engagement devices to be engaged by the shift, and a value of the input shaft rotation speed $N_{IN}$ of the automatic shifting portion 20 comes closer to the synchronized rotation speed of the second speed stage. The output torque of the second electric motor M2 is also increased in association with the progress of the shift.

For the shift in the automatic shifting portion 20, a clutch-to-clutch shift is executed. Therefore, the engagement oil pressure is finely adjusted so as to prevent a shift shock due to the friction engagement devices to be engaged by the shift in the inertia phase of the shift, particularly, from time t13 to t14, i.e., in the ending period of the shift. Although the ending period of the shift is defined as a period from t13 to t14 in FIG. 10, this is not limited to a period corresponding to the ending period of the shift in the coast down shift control of this embodiment.

At time t14, the value of the input shaft rotation speed $N_{IN}$ of the automatic shifting portion 20 is synchronized to the synchronized rotation speed of the second speed stage indicated by a broken line in FIG. 10, and the shift is completed.

On the other hand, FIG. 11 depicts an example when the coast down shift control of this embodiment is performed. In a time interval depicted in FIG. 11, the accelerator opening degree Acc is set to zero as is the case with FIG. 10. Therefore, the vehicle is coasting and the regenerative control by the second electric motor M2 is performed.

At time t21, the execution of downshift from the third speed stage to the second speed stage of the automatic shifting portion 20 is determined and output in association with reduction of the vehicle speed v, for example. From time t21 to t22, the release oil pressure is reduced while the engagement oil pressure is increased to a predetermined waiting pressure and then gradually increased.

At time t22, a value of the input shaft rotation speed $N_{IN}$ of the automatic shifting portion 20 starts changing from the synchronized rotation speed of the third speed stage indicated by a broken line in FIG. 11 and gradually increases. In other words, a torque phase is terminated and an inertia phase is started. As the shift subsequently progresses, the torque capacity increases in the friction engagement devices to be engaged by the shift, and a value of the input shaft rotation speed $N_{IN}$ of the automatic shifting portion 20 comes closer to the synchronized rotation speed of the second speed stage. The output torque of the second electric motor M2 is also increased in association with the progress of the shift.

At time t23, it is determined that the shift enters the ending period since the differential rotation speed $\Delta N_{IN}$ between the synchronized rotation speed $N_{IN}^*$, i.e., the input shaft rotation speed of the automatic shifting portion 20 in the second speed stage, i.e., the shift stage after the shift and the actual input shaft rotation speed $N_{IN}$ of the automatic shifting portion 20 falls below a predetermined value defined in advance such as several hundred rpm, for example, and the coast down shift control of this embodiment is performed.

Specifically, first, the supply oil pressure supplied to the friction engagement devices to be engaged by the shift is reduced. The example of FIG. 11 is depicted as an example of relaxing the gradient of the engagement oil pressure from time t23 to t24 to maintain (retain) the value at time 23. A reduction amount in the reduction of the supply oil pressure or a degree of relaxation of the gradient is set based on at least one of the drag of the automatic shifting portion 20, the rotational acceleration $\Delta N_{IN}/\Delta t$ of the transmitting member 18 that is the input shaft of the automatic shifting portion 20, the vehicle speed v, and the regenerative amounts of the first electric motor M1 and the second electric motor M2 as described above.

From time t23 to t24, a value of the output torque $T_{M2}$ of the second electric motor M2 is increased as compared to the case of not performing the coast down shift control of this embodiment. An example of the temporal change in the output torque $T_{M2}$ in the case of not performing the coast down shift control of this embodiment is indicated by a dotted line in FIG. 11. The input shaft rotation speed $N_{IN}$ of the automatic shifting portion 20 is controlled by the torque $T_{M2}$ of the second electric motor M2 and is changed to the synchronized rotation speed $N_{IN}^*$ after the shift at time t24. This leads to the reduction of the engagement shock due to the synchronization of the shift. The output torque $T_{M2}$ of the second electric motor M2 is increased by an increasing amount based on the differential rotation speed $\Delta N_{IN}$. More specifically, for example, the input shaft rotation speed $N_{IN}$ of the automatic shifting portion 20 is controlled by the feedback control based on the differential rotation speed $\Delta N_{IN}$ such as PID control.

At time t24, the differential rotation speed $\Delta N_{IN}$ turns to zero, i.e., the value of the input shaft rotation speed $N_{IN}$ of the automatic shifting portion 20 is synchronized to the synchronized rotation speed of the second speed stage indicated by a broken line in FIG. 11 to raise the engagement oil pressure for complete engagement and the shift is completed.

As depicted in FIG. 10, if the coast down shift control of this embodiment is not performed in the shift ending period of the automatic shifting portion 20, the engagement oil pressure is finely adjusted so as to reduce the shift shock. On the other hand, as depicted in FIG. 11, in the case of the coast down shift control of this embodiment, adjustment is performed by the torque of the second electric motor M2 in the shift ending period of the automatic shifting portion 20. While the control must be performed in consideration of variations in the friction engagement devices and the hydraulic system, the control of the input shaft rotation speed $N_{IN}$ of the automatic shifting portion 20 is electrically performed by the torque of the second electric motor M2 and, therefore, the control of the input shaft rotation speed N of the automatic shifting portion 20 can accurately be executed by performing the coast down shift control of this embodiment.

According to the embodiment, in the control device 100 for the power transmission device 10 including the differential portion 11 having a regenerative electric motor via the automatic shifting portion 20, if a shift of the automatic shifting portion 20 is performed in a regenerative state of the electric motor in the differential portion 11, since the shift is progressed through hydraulic control before the shift ending period, the regeneration is performed by at least one of the second electric motor M2 and the first electric motor M1 before the shift ending period and, therefore, the deterioration of the regenerative efficiency is reduced. On the other hand, the input shaft rotation speed $N_{IN}$ of the automatic shifting portion 20 is controlled by at least one of the second electric motor M2 and the first electric motor M1 in the shift ending period, the engagement shock can be reduced when the friction engagement devices are engaged in the automatic shifting portion 20, thereby reducing the shift shock According to the embodiment, since the engagement oil pressure is reduced in the shift ending period, when the input shaft rotation speed of the automatic shifting portion 20 is controlled by at least one of the second electric motor M2 and the first electric motor M1 in the shift ending period, the engagement oil pressure is reduced and the torque capacity is lowered in the friction engagement elements to be engaged by the shift and, therefore, the engagement shock can be reduced when the friction engagement devices are engaged in the automatic shifting portion 20, thereby reducing the shift shock.

According to the embodiment, since the reduction of the engagement oil pressure in the shift ending period is performed by reducing or retaining the engagement oil pressure or relaxing the oil pressure gradient, when the input shaft rotation speed $N_{IN}$ of the automatic shifting portion 20 is controlled by at least one of the second electric motor M2 and the first electric motor M1 in the shift ending period, the engagement oil pressure is reduced by reducing or retaining the engagement oil pressure or relaxing the oil pressure gradient; therefore, the torque capacity is lowered in the friction engagement elements to be engaged by the shift; and, as a result, the engagement shock can be reduced when the friction engagement devices are engaged in the automatic shifting portion 20, thereby reducing the shift shock.

According to the embodiment, since the reduction amount of the reduction of the engagement oil pressure is set based on at least one of the drag of the automatic shifting portion 20, the input shaft rotational acceleration $N_{IN}$ of the automatic shifting portion 20, the vehicle speed v, and the regenerative amount of at least one of the second electric motor M2 and the first electric motor M1, the reduction amount of the engagement oil pressure is set depending on the vehicle state at the time of change from a period before the shift end period while the shift is progressed through the hydraulic control to the shift ending period while the input shaft rotation speed $N_{IN}$ of the automatic shifting portion 20 is controlled by at least one of the second electric motor M2 and the first electric motor M1 and, therefore, the engagement shock can appropriately be reduced at the time of engagement of the friction engagement devices depending on the vehicle traveling state, thereby reducing the shift shock.

According to the embodiment, the control of the input shaft rotation speed $N_{IN}$ of the automatic shifting portion 20 by at least one of the second electric motor M2 and the first electric motor M1 is performed by the feedback control based on a value of the input shaft rotation speed $N_{IN}$, i.e., the differential rotation speed $\Delta N_{IN}$ between the input shaft target rotation speed $N_{IN}{}^{*}$ that is the synchronized speed in the shift stage after the shift of the automatic shifting portion 20 and the input shaft rotation speed $N_{IN}$ of the automatic shifting portion 20 and, therefore, the engagement shock can appropriately be reduced at the time of engagement of the friction engagement devices, thereby reducing the shift shock.

According to the embodiment, since the power transmission device 10 has the power distribution mechanism 16 coupled to the automatic shifting portion 20 in a power transmittable manner and the power distribution mechanism 16 includes the first planetary gear device 24 and has the first element RE1 enabled to transmit the input from the engine 8, the second element RE2 coupled to the first electric motor M1, and the third element RE3 enabled to transmit power to the automatic shifting portion 20 and the second electric motor M2, the second electric motor M2 is coupled to the third element RE3 (the transmitting member 18) enabled to transmit power to the automatic shifting portion 20 and the second electric motor M2 and, therefore, the input shaft rotation speed $N_{IN}$ of the automatic shifting portion 20 can easily be controlled by the second electric motor M2, in addition to the effect described above.

According to the embodiment, since the differential portion 11 operates as an electric stepless shifting portion that has a gear ratio of the input shaft 14 and the output shaft, i.e., the transmitting member 18 controlled by controlling the operation states of the first electric motor M1 and the second electric motor M2, the gear ratio of the differential portion 11 (the power distribution mechanism 16) can continuously be varied by controlling the operation states of the first electric motor M1 and the second electric motor M2 and the engine 8 can be operated in an efficient range, in addition to the effect described above.

According to the embodiment, in the case of limiting the output of the second electric motor M2, the control of the input shaft rotation speed of the automatic shifting portion 20 in the shift ending period is implemented by the first electric motor M1 instead or the second electric motor M2 or in addition to the second electric motor M2 and, therefore, if the output of the second electric motor M2 is limited, the control of the input shaft rotation speed N of the automatic shifting portion 20 in the shift ending period can be implemented by the first electric motor M1 connected via the power distribution mechanism 16.

According to the embodiment, since the case of limiting the output of the second electric motor M2 corresponds to the case of limiting the input/output of the electric storage device 60, even if the input/output of the electric storage device 60 is limited because, for example, the charge amount of the electric storage device 60 goes out of a predefined range or the temperature of the electric storage device 60 goes out of a predefined range, and the output of the second electric motor M2 is limited, the control of the input shaft rotation speed $N_{IN}$ of the automatic shifting portion 20 in the shift ending period can be implemented.

According to the embodiment, since the case of limiting the output of the second electric motor M2 corresponds to the case that the temperature of the second electric motor M2 is out of a predetermined range defined in advance, even if the output of the second electric motor M2 is limited because the temperature of the second electric motor M2 is out of a predetermined range defined in advance, the control of the input shaft rotation speed $N_{IN}$ of the automatic shifting portion 20 in the shift ending period can be implemented.

Although the embodiment of the present invention has been described in detail with reference to the drawings, the present invention is applied in other forms.

For example, although the automatic shifting portion 20 of the embodiment is a transmission having four forward speeds and one backward speed, the shift stages and the coupling relationship of the transmission are not particularly limited. For example, the present invention is applicable to any automatic transmissions that execute a shift by engaging the friction engagement devices in the released state to switch a shift stage, for example.

Although the power distribution mechanism 16 of the embodiment has the first carrier CA1 coupled to the engine 8, the first sun gear S1 coupled to the first electric motor M1, and the first ring gear R1 coupled to the transmitting member 18, these coupling relationships are not limited thereto and the engine 8, the first electric motor M1, and the transmitting member 18 may be coupled to any of the three rotating elements CA1, S1, and R1 of the first planetary gear device 24.

Although the first electric motor M1 and the second electric motor M2 are concentrically disposed on the input shaft 14 in the embodiment; the first electric motor M1 is coupled to the first sun gear S1; and the second electric motor M2 is coupled to the transmitting member 18, the electric motors may not necessarily be disposed in this way and, for example, the first electric motor M1 may be coupled to the first sun gear S1 and the second electric motor M2 may be coupled to the transmitting member 18 operatively via a gear, a belt, a reduction device, etc.

Although the engine 8 is directly coupled to the input shaft 14 in the embodiment, the engine 8 may be coupled operatively via a gear, a belt, etc., and may not be disposed on the common shaft center.

In the embodiment, the hydraulic friction engagement devices such as the first clutch C1 and the second clutch C2 may be made up of magnetic, electromagnetic, and mechanical engagement devices such as powder (magnetic particle) clutches, electromagnetic clutches, and meshing type dog clutches. For example, in the case of the electromagnetic clutches, the hydraulic control circuit 42 is made up of a switching device, an electromagnetic switching device, etc., that switch an electric command signal circuit to the electromagnetic clutches, instead of a valve device that switches oil passages.

Although the automatic shifting portion 20 is serially coupled to the differential portion 11 via the transmitting member 18 in the embodiment, a counter shaft may be disposed in parallel with the input shaft 14 and the automatic shifting portion 20 may concentrically be disposed on the counter shaft. In this case, the differential portion 11 and the automatic shifting portion 20 are coupled in a power transmittable manner via a set of transmitting members made up of a counter gear pair, a sprocket, and a chain acting as the transmitting member 18, for example.

The power distribution mechanism 16 acting as the differential mechanism of the embodiment may be, for example, a differential gear device having a pinion rotationally driven by the engine 8 and a pair of bevel gears engaged with the pinion operatively coupled to the first electric motor M1 and the second electric motor M2.

Although the power distribution mechanism 16 of the embodiment is made up of one planetary gear device, the power distribution mechanism 16 may be made up of two or more planetary gear devices and may function as a transmission having three or more stages in the non-differential state (constant shift state). The planetary gear devices are not limited to the single pinion type and may be double pinion type planetary gear devices.

Although the power transmission device 10 has the power distribution mechanism 16 that distributes the drive force of the engine 8 to the first electric motor M1 and the automatic shifting portion 20 in the embodiment, this is not a limitation of the configuration of the power transmission device. In other words, the present invention is applicable to any power transmission device having at least one regenerative electric motor via an automatic shifting portion. Specifically, the power distribution mechanism 16 is not an essential configuration requirement and at least one of the first electric motor M1 and the second electric motor M2 may be included as the regenerative electric motor. The regenerative electric motor is not limited to the form of directly coupling to the transmitting member 18 that is the input shaft of the automatic shifting portion 20. Therefore, the present invention is applicable to a so-called parallel hybrid type power transmission device such as those having an electric motor coupled to a power transmitting member that transmits power from an engine to an automatic shifting portion, for example.

Although the shift ending period is determined when the differential rotation speed $\Delta N_{IN}$ between the synchronized rotation speed $N_{IN}^*$, i.e., the input shaft rotation speed of the automatic shifting portion 20 in the shift stage after the shift and the actual input shaft rotation speed $N_{IN}$ of the automatic shifting portion 20 falls below a predetermined threshold value, this is not a limitation. For example, a threshold value may be defined for elapsed time after a shift determination is output or for elapsed time after actual oil pressure output is started, and the shift ending period may be determined when the elapsed time exceeds the threshold value.

The above description is merely one embodiment and the present invention can be implemented in variously modified or altered forms based on the knowledge of those skilled in the art.

EXPLANATIONS OF LETTERS OR NUMERALS

8: engine (prime mover)
10: power transmission device
16: power distribution mechanism (differential portion)
20: automatic shifting portion (stepped shifting mechanism)
24: first planetary gear device (planetary gear device)

100: electronic control device (control device for power transmission device)
M1: first electric motor (electric motor)
M2: second electric motor (electric motor)

The invention claimed is:

1. A control device for a power transmission device including a regenerative electric motor via a stepped shifting mechanism, wherein
when a shift of the stepped shifting mechanism is performed in a regenerative state of the electric motor, the control device for a power transmission device increases an input shaft rotation speed of the stepped shifting mechanism through hydraulic control before a shift ending period, and, in the shift ending period, restrains an increase of the input shaft rotation speed through the hydraulic control and controls an input shaft rotation speed of the stepped shifting mechanism with the electric motor to be a target rotation speed after the shift.

2. The control device for a power transmission device of claim 1, wherein an engagement oil pressure is reduced in the shift ending period in comparison with that before the shift ending period.

3. The control device for a power transmission device of claim 2, wherein the reduction of the engagement oil pressure is performed by reducing or retaining the engagement oil pressure or relaxing oil pressure gradient before and after the shift ending period.

4. The control device for a power transmission device of claim 3, wherein a reduction amount of the reduction of the engagement oil pressure is set based on at least one of a drag of the stepped shifting mechanism, the input shaft rotational acceleration of the stepped shifting mechanism, a vehicle speed, and a regenerative amount of the electric motor.

5. The control device for a power transmission device of claim 4, wherein the control of the input shaft rotation speed of the stepped shifting mechanism by the electric motor is performed based on a value related to the input shaft rotation speed.

6. The control device for a power transmission device of claim 5, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

7. The control device for a power transmission device of claim 4, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

8. The control device for a power transmission device of claim 3, wherein the control of the input shaft rotation speed of the stepped shifting mechanism by the electric motor is performed based on a value related to the input shaft rotation speed.

9. The control device for a power transmission device of claim 8, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

10. The control device for a power transmission device of claim 3, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

11. The control device for a power transmission device of claim 2, wherein the control of the input shaft rotation speed of the stepped shifting mechanism by the electric motor is performed based on a value related to the input shaft rotation speed.

12. The control device for a power transmission device of claim 11, wherein the power transmission device has a differential portion coupled to the stepped shifting mechanism in a power transmittable manner, wherein the differential portion includes a planetary gear device arid has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

13. The control device for a power transmission device of claim 2, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

14. The control device for a power transmission device of claim 1, wherein the control of the input shaft rotation speed of the stepped shifting mechanism by the electric motor is performed based on a value related to the input shaft rotation speed.

15. The control device for a power transmission device of claim 14, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein
the electric motor corresponds to the first electric motor and the second electric motor.

16. The control device for a power transmission device of claim 1, wherein the power transmission device has a differential portion coupled to the stepped shifting mechanism in a power transmittable manner, wherein the differential portion includes a planetary gear device and has a first element enabled to transmit an input from a prime mover, a second element coupled to a first electric motor, and a third element enabled to transmit power to the stepped shifting mechanism and a second electric motor, and wherein the electric motor corresponds to the first electric motor and the second electric motor.

17. The control device for a power transmission device of claim 16, wherein the differential portion operates as an electric stepless shifting portion that has a gear ratio of an input shaft and an output shaft controlled by controlling operation states of the first electric motor and the second electric motor.

18. The control device for a power transmission device of claim 16, wherein if an output of the second electric motor is limited, the control of the input shaft rotation speed of the stepped shifting mechanism in the shift ending period is implemented by the first electric motor.

19. The control device for a power transmission device of claim 18, wherein the output of the second electric motor is limited in correspondence with limiting input/output of an electric storage device.

20. The control device for a power transmission device of claim 18, wherein the output of the second electric motor is limited when a temperature of the second electric motor is out of a predetermined range defined in advance.

* * * * *